US012522428B2

(12) United States Patent
Hunter

(10) Patent No.: US 12,522,428 B2
(45) Date of Patent: Jan. 13, 2026

(54) ROTATABLE PROPPANT CONTAINER

(71) Applicant: Halliburton Energy Services, Inc., Houston, TX (US)

(72) Inventor: Timothy Holiman Hunter, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 269 days.

(21) Appl. No.: 18/233,995

(22) Filed: Aug. 15, 2023

(65) Prior Publication Data

US 2025/0058964 A1 Feb. 20, 2025

(51) Int. Cl.
*B65D 88/56* (2006.01)
*B66F 9/12* (2006.01)
*E21B 41/00* (2006.01)

(52) U.S. Cl.
CPC ............... *B65D 88/56* (2013.01); *B66F 9/12* (2013.01); *E21B 41/00* (2013.01)

(58) Field of Classification Search
CPC .... B65D 88/56; B65D 88/30; B65D 90/0033; B66F 9/12; E21B 41/00
See application file for complete search history.

(56) References Cited

U.S. PATENT DOCUMENTS

| | | | | |
|---|---|---|---|---|
| 3,089,725 A | * | 5/1963 | Bertels | B65D 88/56 414/419 |
| 3,124,265 A | | 3/1964 | Bertels | |
| 4,496,275 A | * | 1/1985 | Harp | B66C 13/08 414/754 |
| 4,613,064 A | | 9/1986 | Meyer et al. | |
| 5,499,746 A | * | 3/1996 | Berrebi | B01J 8/0015 222/165 |
| 9,102,460 B2 | * | 8/2015 | Pylinski | B65D 90/587 |
| 11,873,160 B1 | * | 1/2024 | Oren | G01F 15/063 |
| 2013/0206415 A1 | * | 8/2013 | Sheesley | B65G 65/00 166/308.1 |

(Continued)

FOREIGN PATENT DOCUMENTS

| | | |
|---|---|---|
| CN | 202880195 U | 4/2013 |
| DE | 1913785 U | 4/1965 |

(Continued)

OTHER PUBLICATIONS

Foreign Communication from Related Application—The Examiner's Report from the Canadian Intellectual Property Office Application No. 3,212,884, dated Jan. 20, 2025. 7 pages.

*Primary Examiner* — Donnell A Long
(74) *Attorney, Agent, or Firm* — Conley Rose, P.C.; Rodney B. Carroll

(57) ABSTRACT

A storage cube for transporting bulk materials from a supply location to a wellsite comprising a generally cube shape of sidewalls with a left positioning device, a right positioning device, and a discharge gate coupled to an outlet portal configured to an open position or a meter position. The storage cube includes an angled dispenser formed with a first angled corner, a second angled corner, the back side, and the front side. The dispensing angle formed by each side of the angled dispenser is a function of the position of the storage cube. The storage cube is configured to deliver a volume of bulk material greater than a comparable volume of a portable container.

21 Claims, 15 Drawing Sheets

(56) References Cited

U.S. PATENT DOCUMENTS

| | | | | |
|---|---|---|---|---|
| 2015/0368037 A1* | 12/2015 | Oren | ............... | B61B 1/005 |
| | | | | 414/809 |
| 2015/0368038 A1* | 12/2015 | Oren | ............... | B65D 88/022 |
| | | | | 220/601 |
| 2016/0039433 A1* | 2/2016 | Oren | ............... | B61D 3/20 |
| | | | | 410/68 |
| 2019/0255982 A1* | 8/2019 | O'Neill | ............... | B60P 7/132 |
| 2020/0240240 A1* | 7/2020 | Oehler | ............... | B65G 69/08 |

FOREIGN PATENT DOCUMENTS

| | | | | | |
|---|---|---|---|---|---|
| DE | 202004018041 | U1 * | 1/2005 | ............... | B61D 9/12 |
| GB | 1416491 | A * | 12/1975 | ............... | B65D 90/14 |
| WO | WO-0130681 | A1 * | 5/2001 | ............... | B66C 1/663 |
| WO | WO-02051236 | A2 * | 7/2002 | ............... | B65D 88/56 |
| WO | WO-2022198243 | A2 * | 9/2022 | ............... | B65D 88/56 |

\* cited by examiner

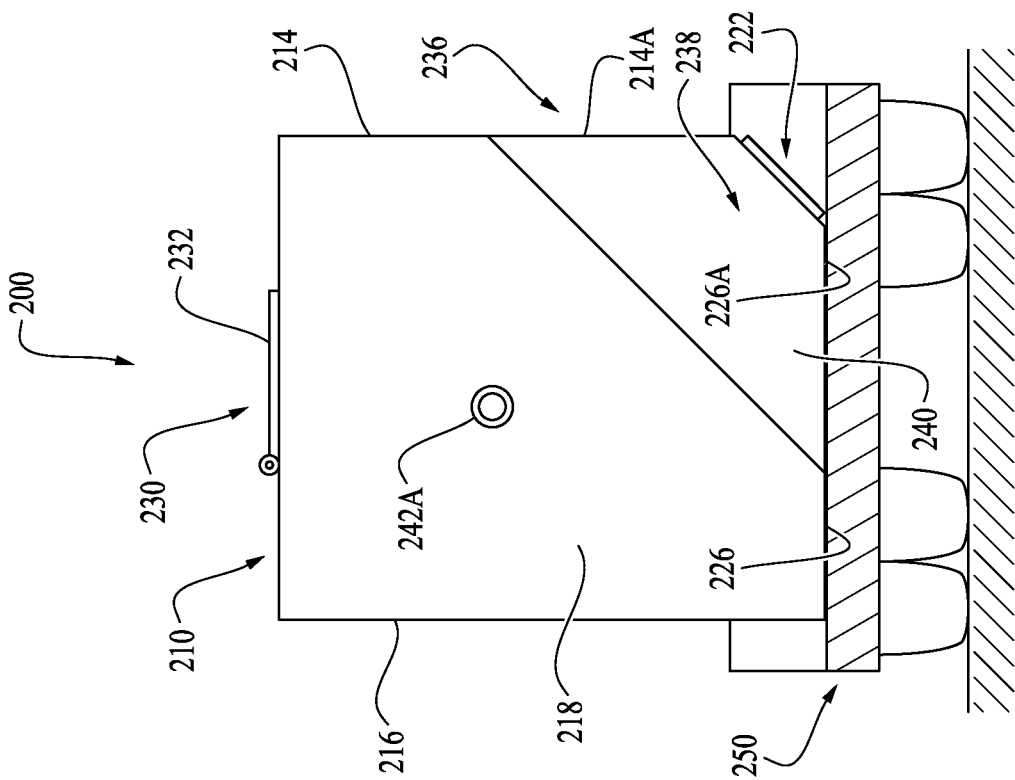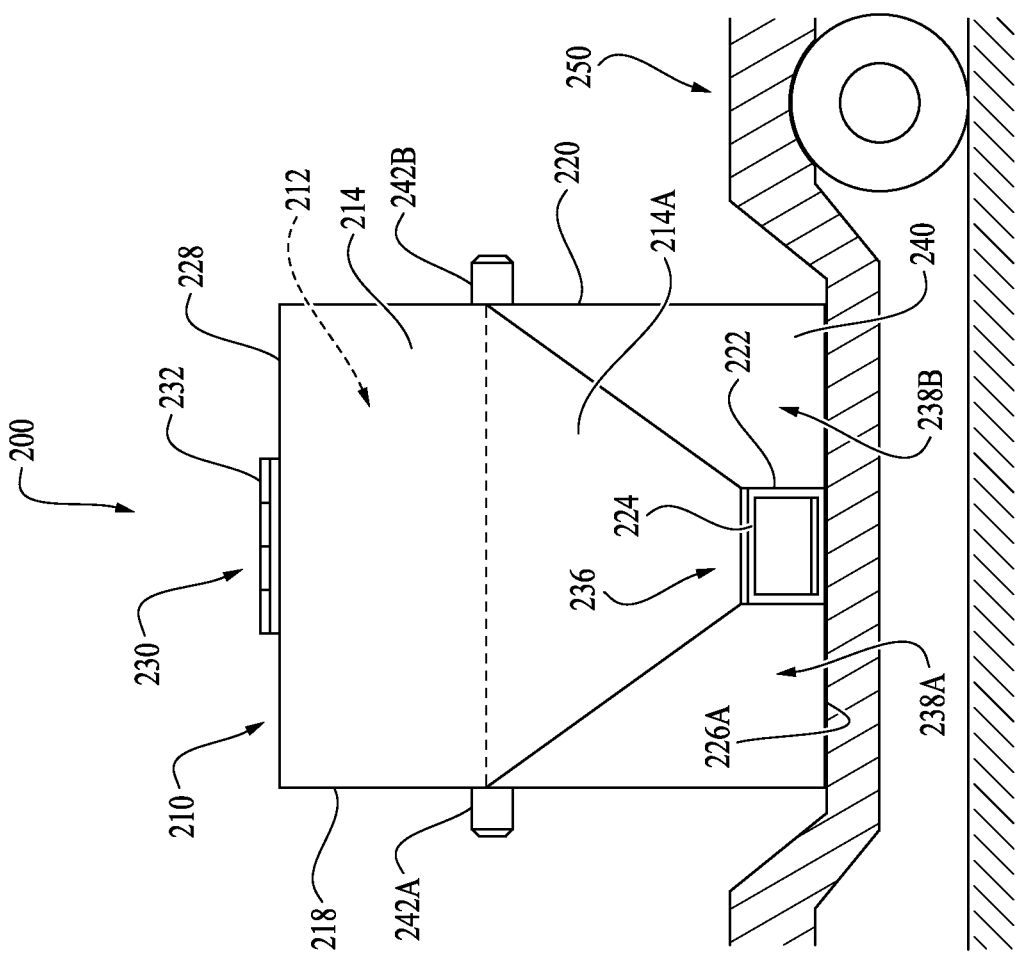

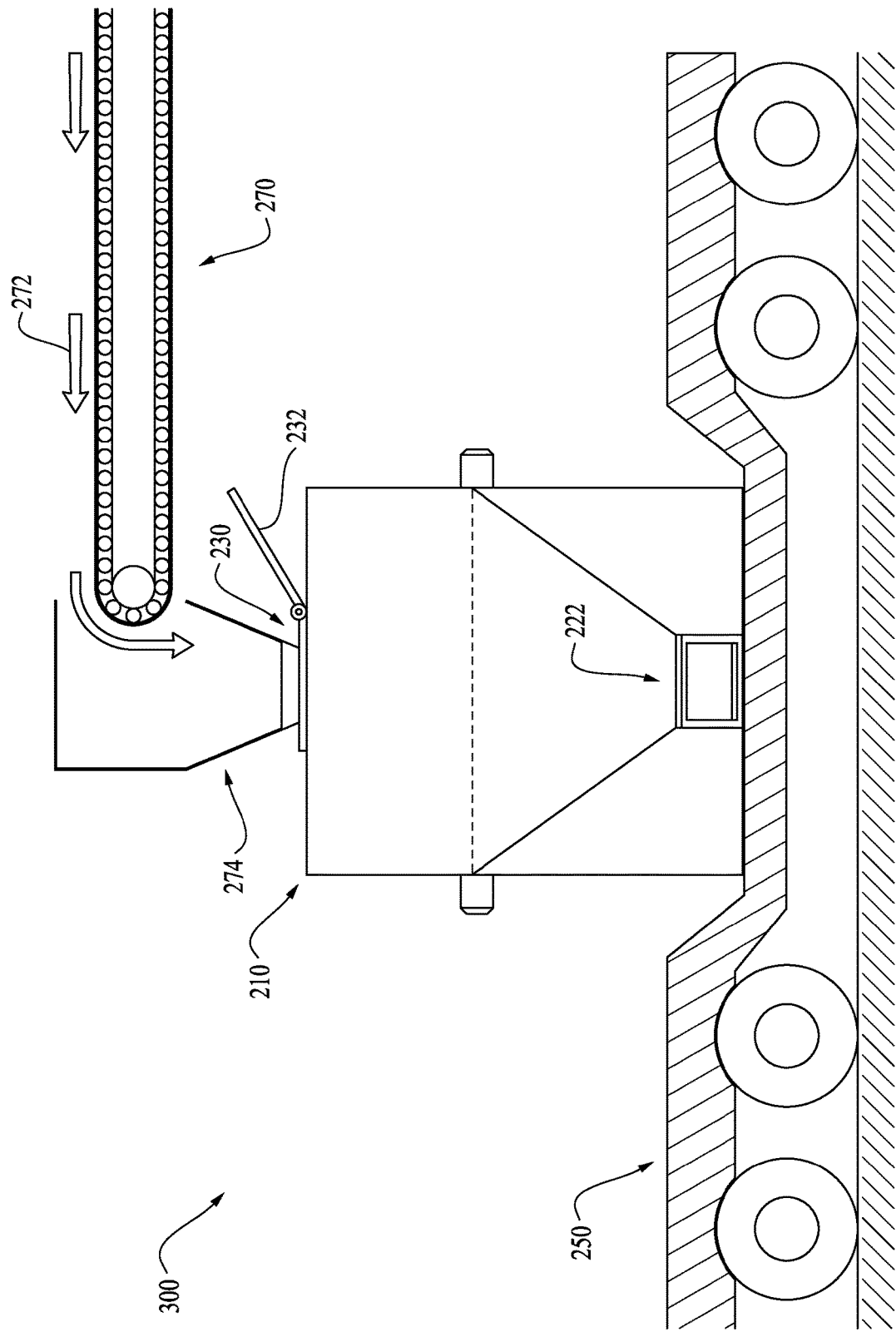

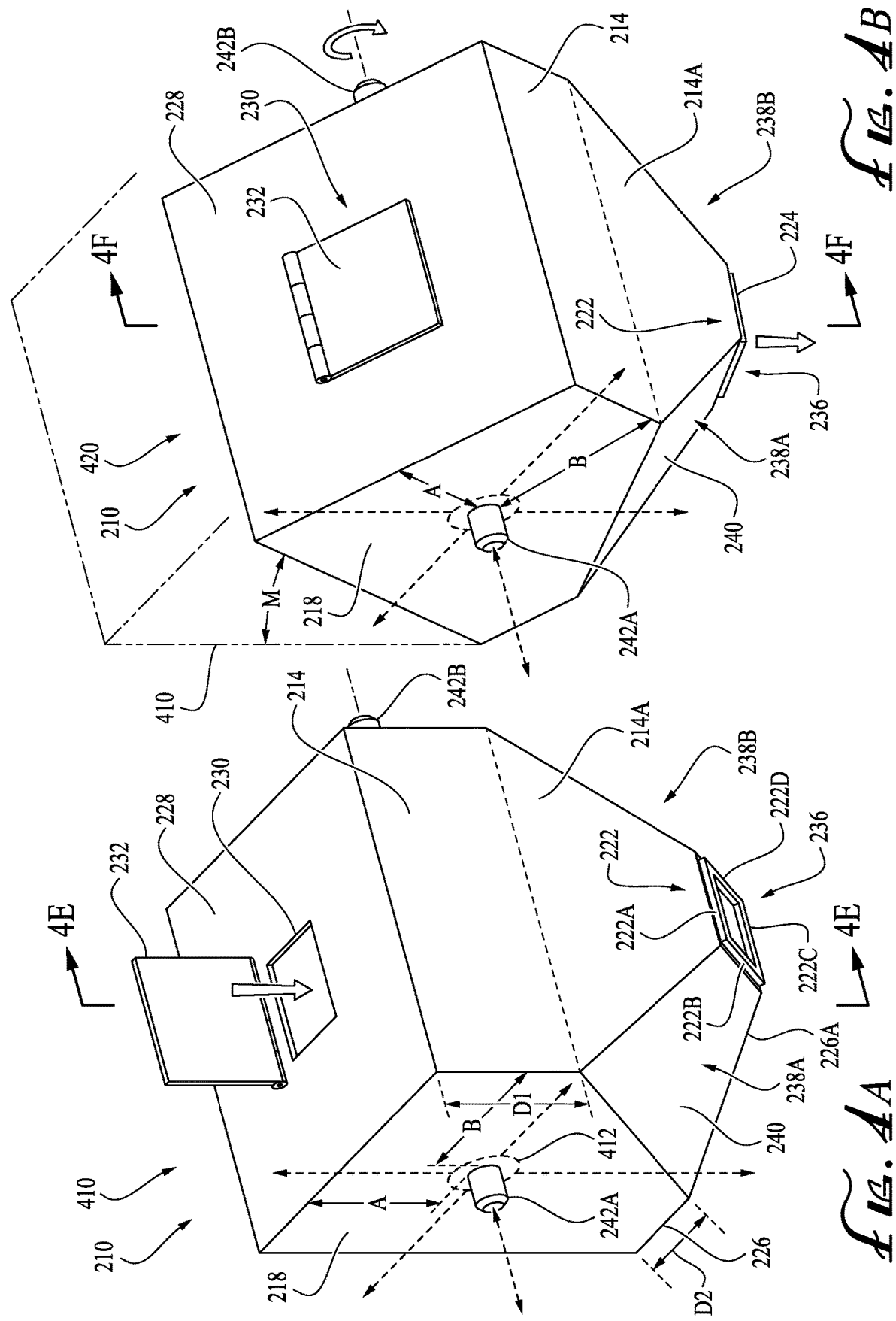

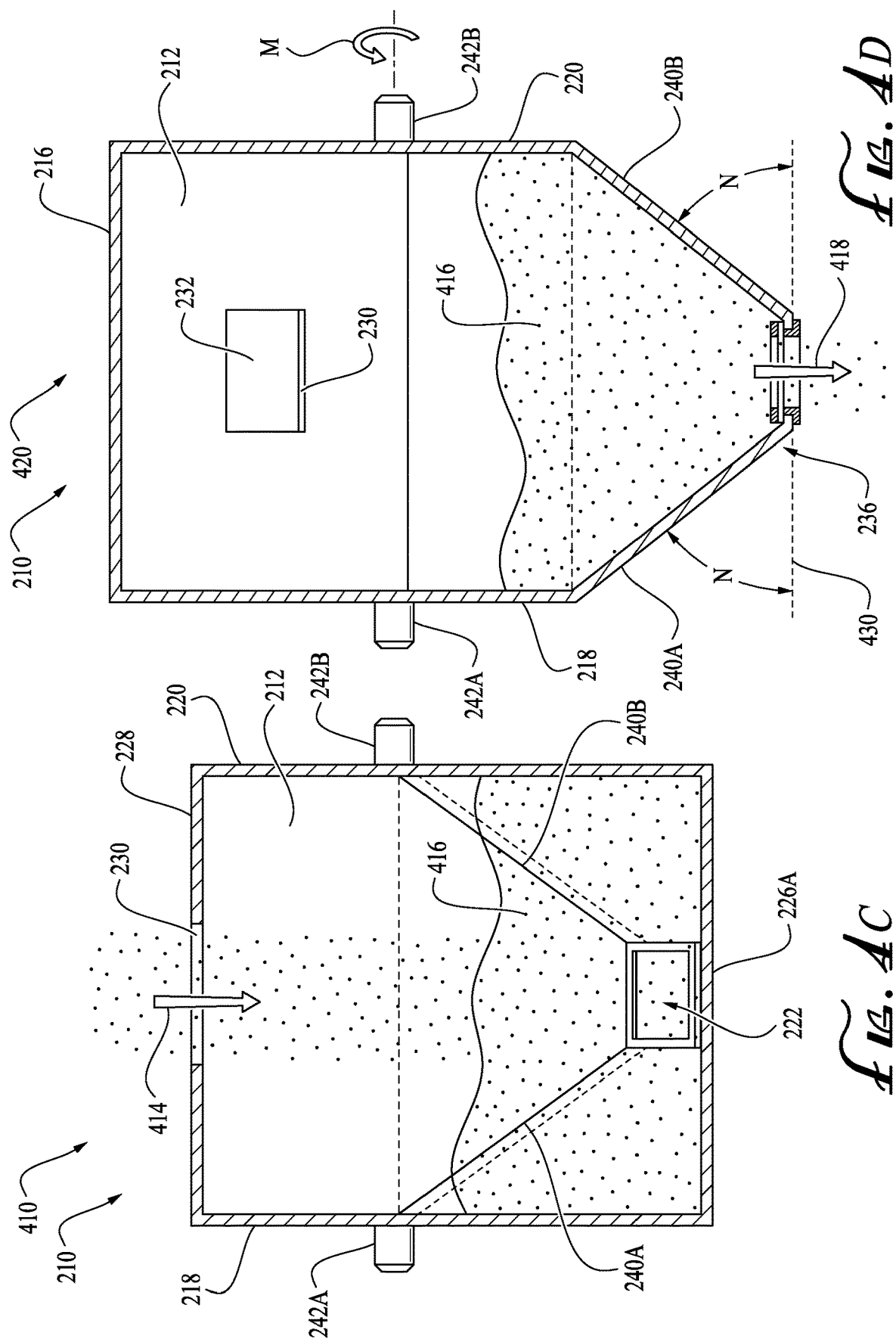

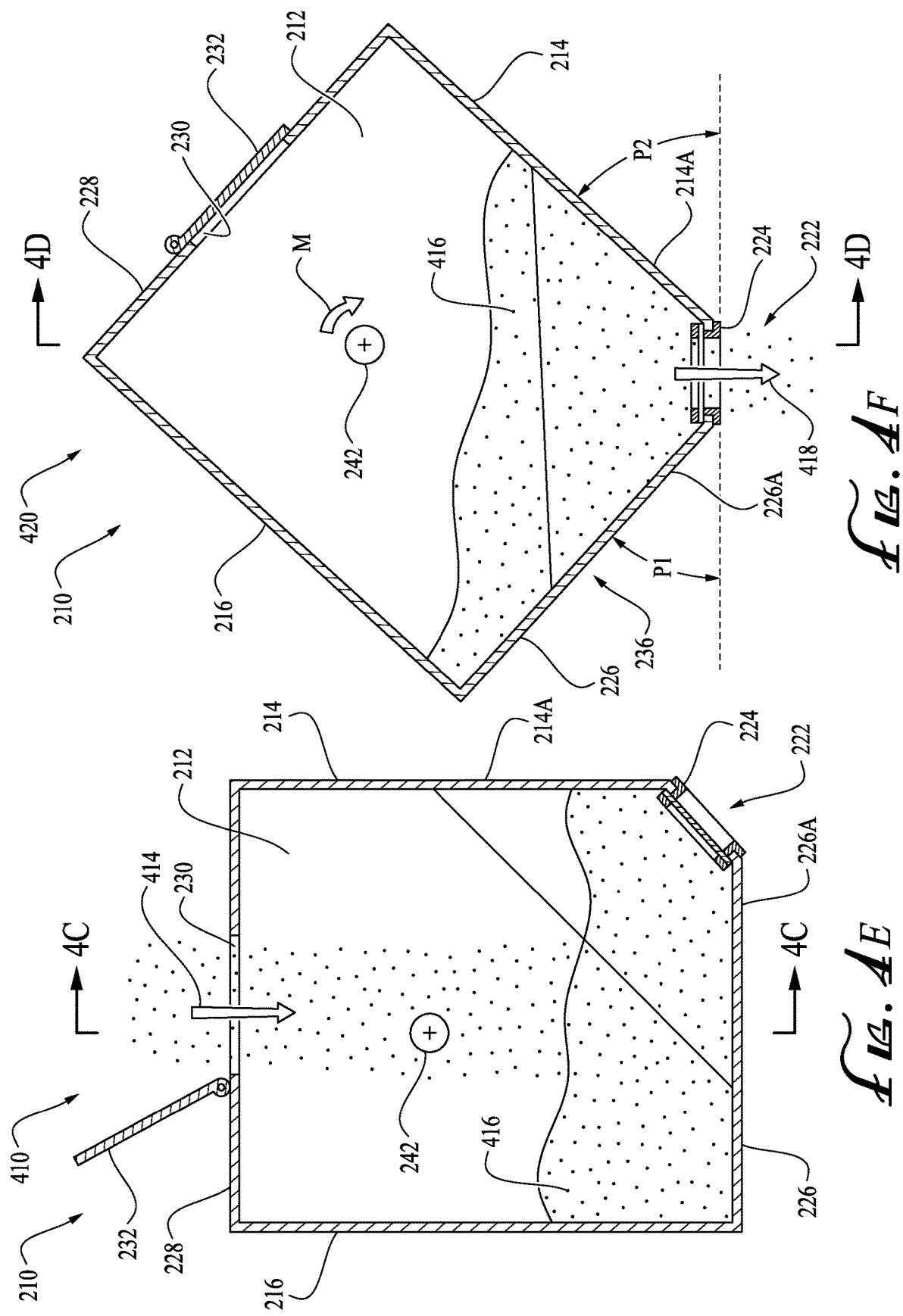

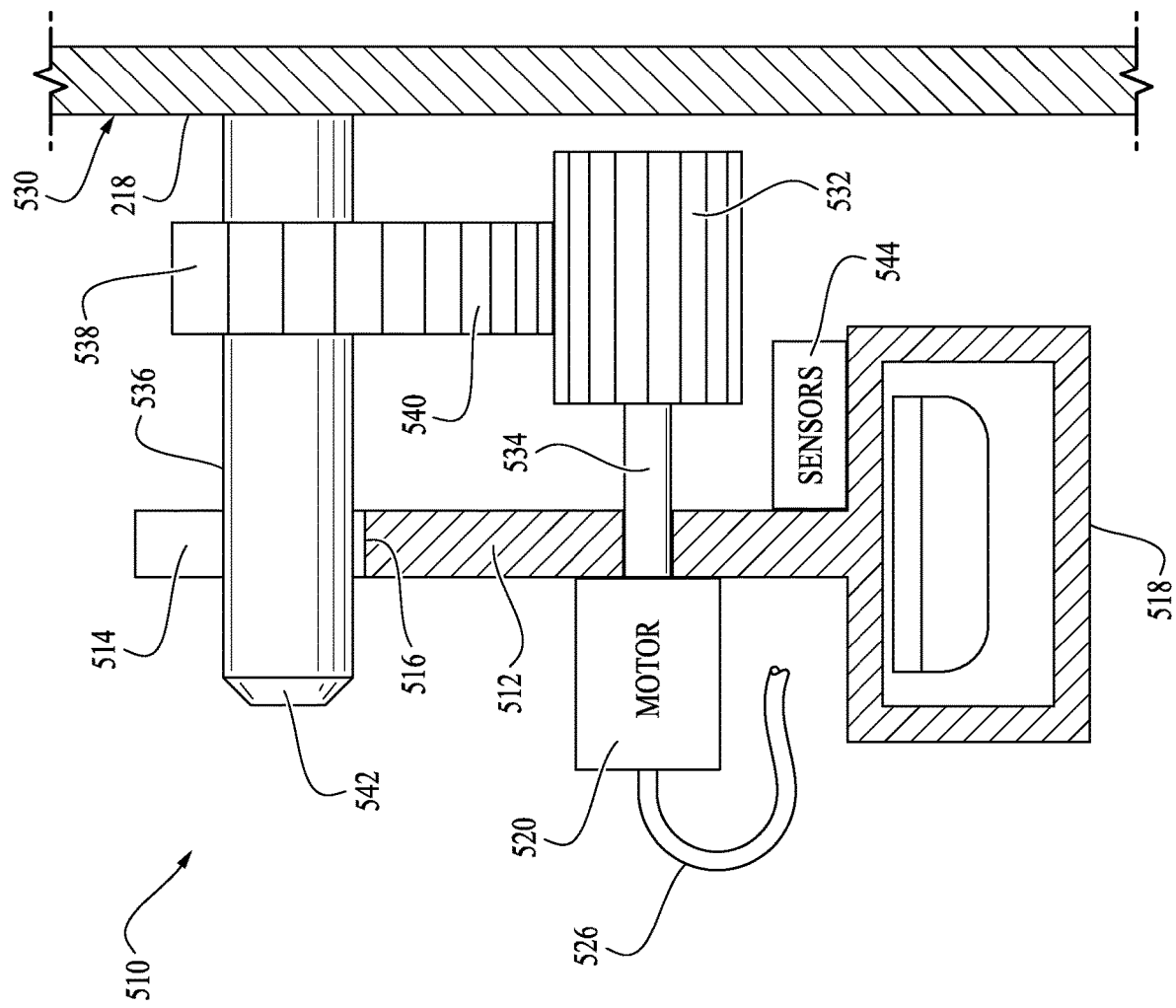

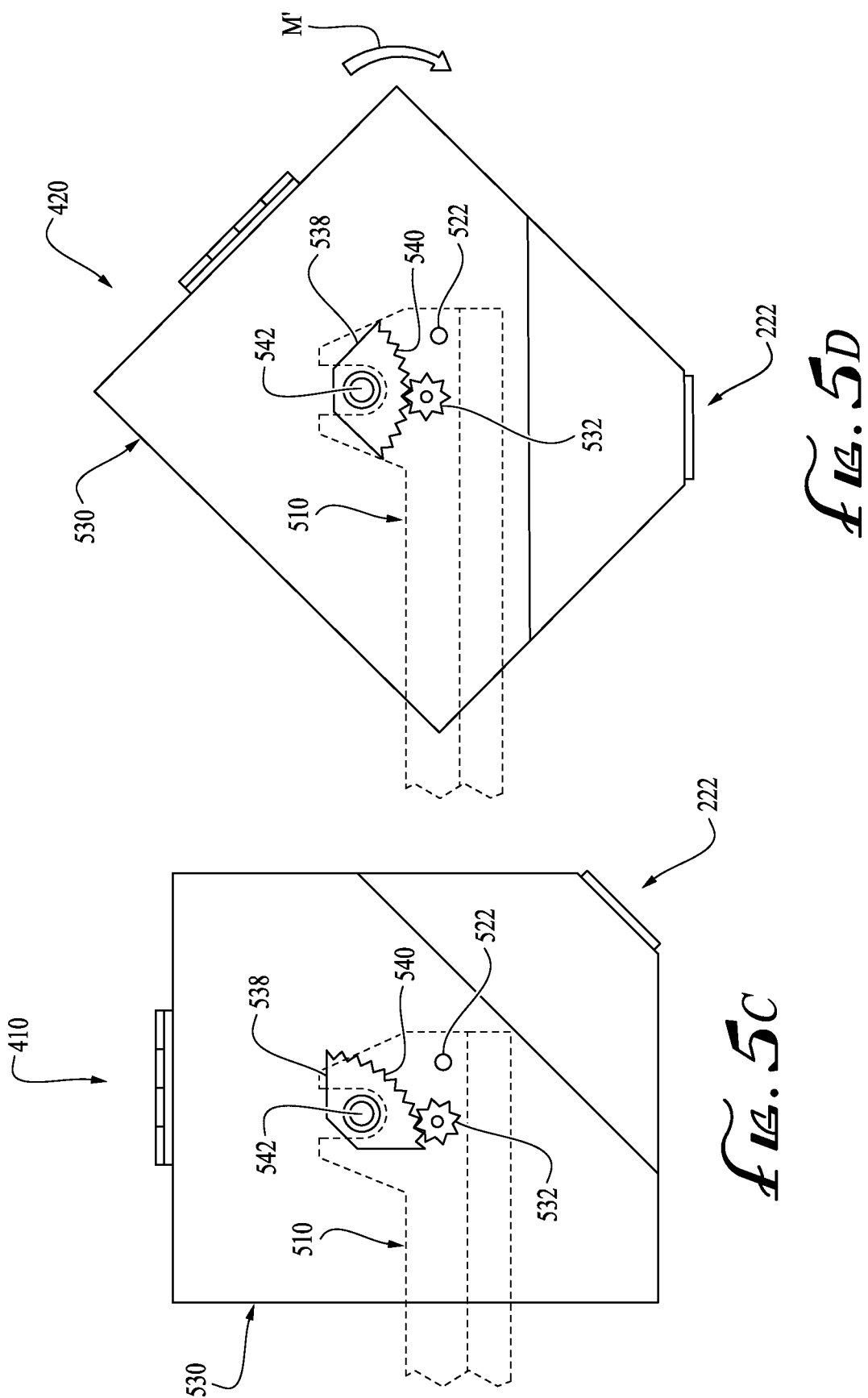

ROTATABLE PROPPANT CONTAINER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Drilling and completing a wellbore to recover oil and gas from a subterranean formation involves a series of construction steps designed to extract hydrocarbons efficiently and safely. The process typically begins with the selection of a drilling location based on geological studies and seismic data analysis. Once the drilling site is identified, a drilling operation commences with the drilling of the wellbore, which involves the use of a drill bit attached to the bottom of a drill string. The drill string is typically rotated, and a drilling mud, e.g., a combination of water, weighting materials, and additives, is circulated down the drill string and back up the annular space between the drill string and the wellbore walls. Once the desired depth is reached, the drilling phase of the wellbore construction process is completed, and the wellbore can be isolated from wellbore fluids.

A primary cementing operation comprises the installation of casing, also referred to as a casing string, which consists of metal tubulars, e.g., steel pipes, coupled together, placed into the wellbore, and cemented in place. The cementing operation can place a cement slurry tailored for the wellbore environment within an annular space between the casing and the wellbore. The cemented casing string provides structural integrity, prevents well collapse, and isolates different geological formations to ensure the flow of hydrocarbons from the target zone.

The wellbore construction process can include a wellbore stimulation operation, e.g., hydraulic fracturing, to create a flow path for the hydrocarbons. For example, the wellbore can be opened to an oil bearing formation, for example, with a perforating gun and the wellbore stimulation operation can pump a fracturing fluid, e.g., water and sand, at a high pressure and flowrate to crack or fracture the formation and deposit sand into the cracks. The sand can prop open the fractures within the hydrocarbon bearing formation and provide a pathway to the casing string. The pumping operation can utilize large volumes of water and sand during the wellbore stimulation operation.

Recent developments in bulk material handling operations involve the use of portable containers for transporting bulk material from a mining location to the wellsite. The bulk material, e.g., sand, can be wet or can include a high water content. These portable containers can be brought in on trucks, unloaded from the trucks, stored on location, and manipulated about the wellsite when the material is needed. The portable containers dispense the bulk materials onto a mechanical conveying system, e.g., conveyor belt, auger, bucket lift, etc., to move the material to a desired destination at the wellsite. However, the water content within the bulk materials inside the portable containers can inhibit the discharge of material from the portable containers. One solution to discharging wet bulk materials can include the use of vibration devices and vibratory energy. However, problems arise from such systems, which may add additional weight to the portable containers and unduly vibrate an entire structure, e.g., stand, and all ancillary equipment contacting or supported by such vibrating structure (thereby subjecting such ancillary equipment to damage). A method of dispensing wet bulk materials from portable containers is desirable.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2A and FIG. 2B are side views of a portable container loaded on a transport according to an embodiment of the disclosure.

FIG. 3 is an illustration of a portable container on a transport in a loading position according to an embodiment of the disclosure.

FIG. 4A is a perspective view of the portable container in a loading position according to an embodiment of the disclosure.

FIG. 4B is a perspective view of the portable container in a dispensing position according to an embodiment of the disclosure.

FIG. 4C is a partial cross-sectional front view of the portable container in a loading position according to an embodiment of the disclosure.

FIG. 4D is a partial cross-sectional front view of the portable container in a dispensing position according to an embodiment of the disclosure.

FIG. 4E is a partial cross-sectional side view of the portable container in a loading position according to an embodiment of the disclosure.

FIG. 4F is a partial cross-sectional side view of the portable container in a dispensing position according to an embodiment of the disclosure.

FIG. 5B is an end view of a handling device coupled to the portable container according to another embodiment of the disclosure.

FIGS. 5C and 5D are side views of the portable container in a loading position and a dispensing position according to another embodiment of the disclosure.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Certain embodiments according to the present disclosure may be directed to systems and methods for efficiently managing bulk material (e.g., bulk solid or liquid material). Bulk material handling systems are used in a wide variety of contexts including, but not limited to, drilling and completion of oil and gas wells, concrete mixing applications, agriculture, and others. The disclosed embodiments are directed to systems and methods for efficiently moving bulk material into a blender inlet of a blender unit at a job site. The systems may include a portable support structure used to receive one or more portable containers of bulk material and output bulk material from the containers directly into the blender inlet. The disclosed techniques may be used to efficiently handle any desirable bulk material having a solid or liquid constituency including, but not limited to, sand, proppant, gel particulate, diverting agent, dry-gel particulate, liquid additives and others.

As defined herein, wet bulk material can contain a range of water content. In some scenarios, the wet bulk material can be mined proppant with a residual water content. In other scenarios, the wet bulk material can have water added, e.g., sprayed onto the top of the dry material, to prevent formation of dust. The wet bulk material can be considered to be "wet" when the moisture content within all or a portion of the bulk material deters or inhibits the bulk material's flowability, e.g., an increased angle of repose compared to a dry sample of bulk material. For example, sand is considered "wet" when the sand contains from 0.2 percent to about 15 percent residual liquid content by weight.

Figure 1:
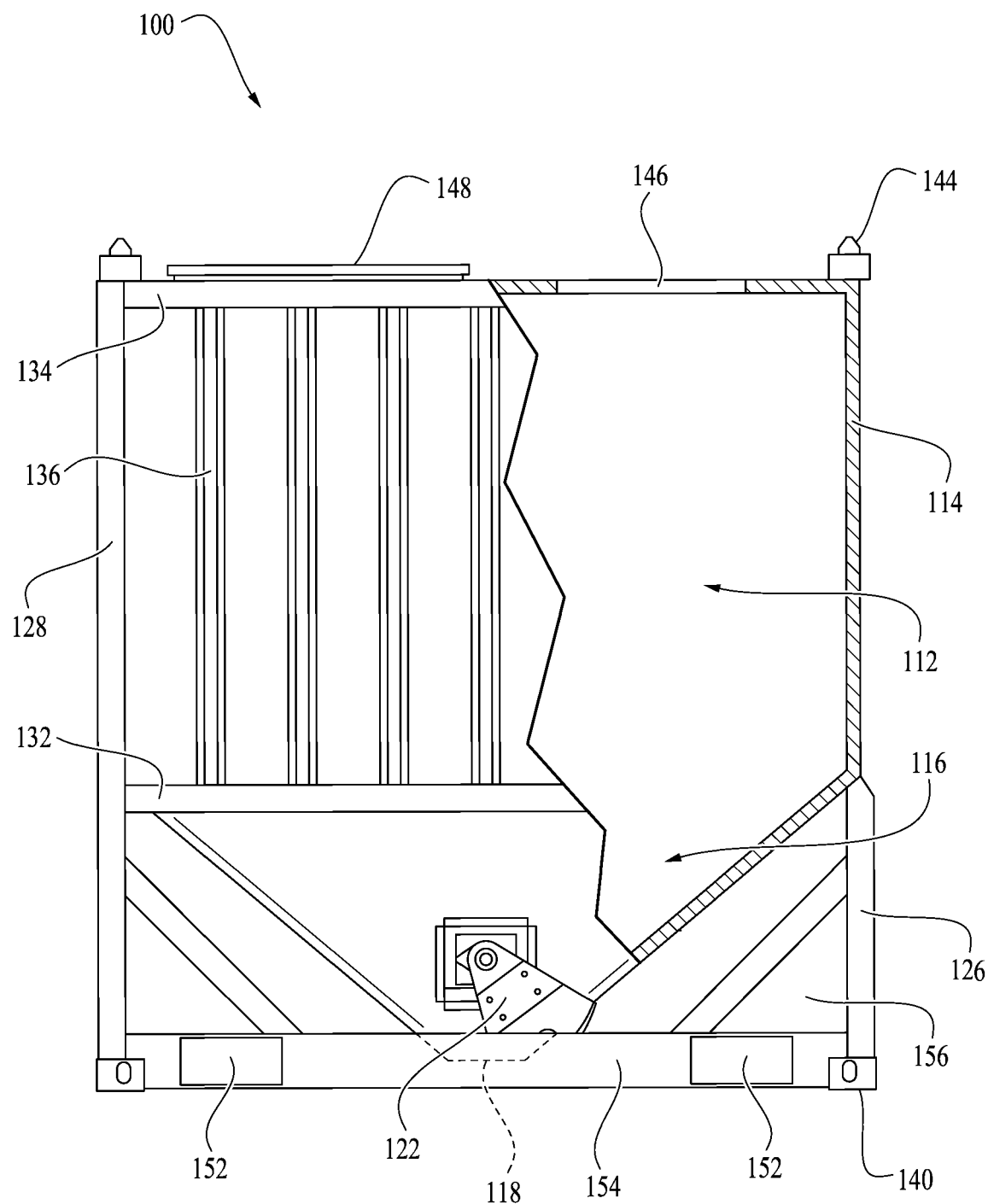
FIG. 1 is a side view of a portable container according to an embodiment of the disclosure.

Wellbore servicing operations at remote wellsites can utilize a portable container to store and to dispense dry material (e.g., sand, proppant, gel particulate, or dry-gel particulate) for the formation of wellbore treatment fluids. Turning now to FIG. 1, a portable container for bulk materials is described. The portable container 100 comprises an interior portion and a support structure. The interior portion of the portable container 100 includes an interior 112 that is defined by an opposed system of four vertical rectilinear sidewalls, e.g., sidewall 114, and an angled hopper 116 leading to an outlet 118. The angled hopper 116 can be formed by four sidewalls at an angle in the range of 40 degrees to 60 degrees from the horizontal in an upside down pyramidal shape. The sidewalls 114 can be rigid (e.g., planar metal) or flexible (e.g., cloth type material). At least one inlet portal 146 can be located at the top of the portable container 100 for filling the interior 112 with bulk material. An inlet hatch 148 can be configured to selectively open and close the inlet portal 146. A discharge gate 122 can be rotationally coupled to a pivot point on the angled hopper 116 and have an open configuration and a closed configuration.

The support structure of the portable container can include a frame or an open structure configured to support or reinforce the interior portion. The sidewalls 114 are supported by a frame that includes a plurality of vertical members 126, 128, horizontal members 132, 134, and plurality of corrugations 136. The lower corners of the frame can include engagement features 140 configured to interface with the locator features on the portable container or on related equipment. The upper corners of the frame can include locator features 144 configured to interface with the engagement features 140. A bottom support 154, including a pair of lift tubes 152 and the engagement features 140, can be coupled to the bottom of the frame by modal supports 156. The discharge gate 122 can be a ladder gate, a clamshell gate, or an iris gate that may be mechanically opened and closed for the selective discharge of proppant. Although the angled hopper is described as comprising four sidewalls with a pyramidal shape, it is understood that the angled hopper can comprise any number of angled sidewalls including three angled sides, four angled sides, five angled sides, six angled sides, seven angled sides, eight angled sides, or combinations thereof.

The support structure of the portable container can be configured to enable the portable containers to be loaded and/or unloaded from the transport, manipulated about the wellsite, and stacked for storage before and after use. However, the support structure can limit the amount of bulk materials, e.g., volume of sand, that can be loaded into the portable containers. The total weight of the portable containers can be weight limited by various regulatory agencies. For example, the department of transportation in Texas may limit the weight a transport can carry to 55,000 pounds or less. The total weight of the portable container is a combined weight of the support structure, the interior portion, and the volume of the bulk material. Thus, the support structure of portable container can reduce the volume of the bulk material the portable container can transport. A portable container without a support structure is desirable.

One solution to a portable container without a support structure can be a rotatable container, also referred to as a sand cube. In some embodiments, the rotatable container can be a generally square or cube shape with trunnions on the side for lifting and a first position configured for filling and a second position configured for dispensing. In the first position, the rotatable container can sit or locate on a bottom surface with an inlet portal on the top surface for filling. The bottom surface can be flat or planar similar to a cube shape. In some embodiments, a modified shape of the rotatable container can be formed by removing two corners proximate an outlet of the rotatable container. The modified shape can be configured as a hopper with sloped or slanted sides when the rotatable container is rotated about the trunnions to the second position.

In some embodiments, the sand cube can be oscillated via the trunnions to dispense a wet bulk material or a bulk material with a water content. A cube manipulator can engage the trunnions on the sand cube for lifting and rotate the sand cube into the second position or dispensing position. In some embodiments, the cube manipulator can oscillate the sand cube, e.g., small rotational movements, to loosen the wet bulk material or disengage the bulk material from the sides of the sand cube.

Disclosed herein is a rotatable container, also referred to as a sand cube, with trunnions for lifting and a modified shape for dispensing bulk material. The sand cube with a smaller support structure can transport a larger volume of bulk material from a mining location to a remote wellsite. In some embodiments, a cube manipulator coupled to a forklift, crane, or similar lifting system can retain the sand cube in a first position while lifting and transporting the sand cube. The cube manipulator (on the fork lift or crane) can rotate the sand cube to a second or dispensing position. In some embodiments, the cube manipulator can oscillate the sand cube to dislodge bulk material from the sides of the interior during dispensing. In some embodiments, the sand cube can dispense bulk material into a portable container with a support frame, into a hopper of a blender, or onto a conveyor for transport to another part of the wellsite. In some embodiments, the sand cube can be positioned onto a portable support structure to dispense the bulk material and/or meter the bulk material into a hopper.

Disclosed herein is a material handling system for transporting bulk material to a remote wellsite and for feeding the bulk material into a hopper via a cube manipulator or a portable support structure. The support structure can elevate the bulk material containers, e.g., sand cubes, to a sufficient height above the blender inlet and route the bulk material directly from the containers to the blender inlet. The support structure can oscillate the sand cubes to dislodge bulk material and aid in dispensing bulk material. This system may lower the cost of the wellbore treatment operation by using all or a greater portion of the bulk material within each portable container before replacement. This may improve the efficiency of the operation by returning empty or nearly empty sand cubes to the bulk material supplier for refilling. In addition, the portable support structure may simplify the operation of transferring bulk material, reduce material spillage, and decrease dust generation.

A sand cube for transporting bulk material, e.g., sand, from a supply location to a remote wellsite can be transported on a transport, e.g., a trailer. Turning now to FIGS. 2A and 2B, a side view and a rear view of a transportation environment 200 for transporting bulk material with a sand cube is described. In some embodiments, the sand cube 210 comprises an interior 212 that is defined by an opposed system of four vertical rectilinear sidewalls, a front side 214, a left side 218, a back side 216, and a right side 220. The sidewalls of the sand cube can form a 90 degree angle where two or three sidewalls meet. For example, a 90 degree angle can be formed where the back side 216 and the left side 218 meet. The front side 214 can include an outlet portal 222 with a discharge gate 224. The interior 212 of the sand cube 210 can be further defined by a bottom side 226 and a top side 228. At least one inlet portal 230 can be located on the top side 228 of the sand cube 210 for filling the interior 212 with bulk material. An inlet hatch 232 can be configured to selectively open and close the inlet portal 230. The discharge gate 224 can be a slide gate, a knife gate, a clam shell gate, or any other suitable closure mechanism and mechanically coupled a truncated corner forming a 45 degree angle between the front side 214 and the bottom side 226 of the sand cube 210. The discharge gate 224 can be configured in an open configuration, a partially open configuration, and a closed configuration. Although the discharge gate 224 and outlet portal 222 are illustrated on the truncated corner, the outlet portal 222 can be located on the front side 214 or the bottom side 226.

In some embodiments, an angled dispenser 236 can be formed with angled corners 238 where a portion of the front side 214, the bottom side 226, and either the right side or left side is replaced with an angled sidewall 240. The angled sidewall 240 can form the angled dispenser 236 as will be described further herein.

In some embodiments, a trunnion can be mechanically coupled to the walls of the sand cube 210 for lifting and handling. A trunnion 242 can be a generally rod shaped member mechanically coupled to each side of the sand cube 210. For example, a left trunnion 242A can be coupled to the left side 218 and a right trunnion 242B can be coupled to the right side 220. Although the trunnion 242 is illustrated as generally rod shaped, it is understood that the trunnion can have any geometric cross-section, for example, square, hexagon, octagon, or any other suitable cross-sectional shape. In some embodiments, the trunnion 242 may include gear teeth or the trunnion 242 can be part of an assembly that includes gear teeth as will be disclosed further herein.

In the transportation environment 200 illustrated in FIGS. 2A and 2B, the sand cube 210 is loaded onto a transport 250 for loading and delivery to a remote wellsite. In some embodiments, the transport 250 can be a truck, a trailer, a rail car, or other suitable transportation methods. In the exemplary transportation environment 200, the bottom side 226 of the sand cube 210 is sitting or located on a load surface of the transport 250.

Turning now to FIG. 3, a loading environment 300 is described. In some embodiments, the sand cube 210 can be loaded with bulk material 272 by a conveyor 270. For example, a hopper mechanism 274 of the conveyor 270 can be aligned with the inlet portal 230 of the sand cube 210 for loading of the bulk material 272. Although the conveyor 270 is illustrated as a belt conveyor, it is understood that any conveying mechanism, e.g., sand screw, can be used. Although the sand cube 210 is illustrated as installed on a transport 250, e.g., trailer, it is understood that the sand cube 210 can be loaded separate from the transport 250 or while loaded onto a trailer, a railcar, a barge, a boat, or any other suitable transport.

The geometric shape of the sand cube 210 can be described by contrasting the loading position and the dispensing position. Turning now to FIGS. 4A and 4B, a perspective view of the sand cube 210 in a loading position 410 and a dispensing position 420 respectively can be described. In FIG. 4A, the sand cube 210 can be located in a loading position 410 with the bottom side 226 mounted or sitting on a loading surface, e.g., transport 250. As previously described, the sand cube 210 comprises an angled dispenser 236 formed by a left truncated side 238A on the left side and a right truncated side angled 238B on the right side of the front side 214. The left truncated side 238A can be a beveled corner comprising a portion of the front side 214, the left side 218, and the bottom side 226. The right truncated side 238B can be a beveled corner comprising a portion of the front side 214, the right side 220, and the bottom side 226. In a context, the truncated side 238A-B can be formed by replacing a 90 degree corner with a beveled corner that couples to the left side 218 or right side 220, the front side 214, and the bottom side 226. The trunnion 242 can be located on the left side 218 at a distance A from the top side 228 and a distance B from the front side 214. In some embodiments, the distance A and distance B locate the trunnion 242 in the center of gravity for the sand cube 210 i) in the unloaded condition, ii) in a partially loaded condition, e.g., 60% full of material, iii) in a fully loaded condition, or iv) in a dispensing condition, e.g., dispensing position 420. In some embodiments, the trunnion 242 is positioned in a region 412 of the center of gravity. In some embodiments, the sand cube 210 is pivotable about an axis that passes through or proximate the center of gravity of a filled container.

Turning to FIG. 4B, the sand cube 210 can be transitioned to a dispensing position 420 by rotation at the left trunnion 242A and right trunnion 242B. In some embodiments, a handling device can rotate the sand cube 210 from a first position, e.g., loading position 410, to a second position, e.g., dispensing position 420. The sand cube 210 can be rotated an angle "M" by the handling device (not shown). In the exemplary dispensing position 420, the angle "M" is 45 degrees or in a range of 40 to 50 degrees. Although the angle "M" is described as 45 degrees or in a range of 40 to 50 degrees, it is understood that the angle "M" can be 35, 36, 37, 38, 39, 40, 41, 42, 43, 44, 45, 46, 47, 48, 49, 50, 51, 52, 53, 54, 55, or fraction of an angle in the range of 40 to 50 degrees, 35 to 55 degrees, 30 to 60 degrees, 25 to 65 degrees, 20 to 70 degrees, 10 to 80 degrees, or zero to 90 degrees. In some embodiments, the outlet 222 can be generally parallel to a planar surface of the ground. The outlet 222 and gate 224 can be positioned at an angle M from the horizontal in the loading position of FIG. 4A so that the outlet 222 and gate 224 are generally horizontal, e.g., parallel to the ground, in the dispensing position 420 of FIG. 4B.

Turning now to FIGS. 4C and 4D, a partial cross-sectional view of the sand cube 210 in a loading position 410 and a dispensing position 420 respectively can be described. In FIG. 4C, the sand cube 210 can be located in an exemplary loading position 410 with the bottom side 226 mounted or sitting on a loading surface, e.g., transport 250. In this exemplary loading position 410, an inflow 414 of bulk material is illustrated flowing through inlet portal 230. A volume 416 of bulk material is accumulating within the interior 212 of the sand cube 210.

Turning to FIG. 4D, the sand cube 210 can be rotated an angle "M" into the dispensing position 420. In the exemplary dispensing position 420, an outflow 418 of material from the volume 416 of bulk material can exit the outlet portal 222 through a discharge gate 224. In some embodiments, the discharge gate 224 can meter the outflow 418 of material based on the position of the gate, e.g., 50% open. The angled dispenser 236 can be formed with side 240A and side 240B. In the exemplary sand cube 210, the angled side 240A and 240B can form an angle "N" with a horizontal plane and/or axis 430. Although the angle "N" is illustrated at 45 degrees, it is understood that the angle "N" can be 35, 36, 37, 38, 39, 40, 41, 42, 43, 44, 45, 46, 47, 48, 49, 50, 51, 52, 53, 54, 55, 56, 57, 58, 59, 60 or fraction of an angle in the range of 40 to 50 degrees, 35 to 55 degrees, 30 to 60 degrees, or 25 to 65 degrees. As previously described, the angled dispenser 236 can be formed by truncated side 238A-B, e.g., angle wall 240A-B coupled to the left side 218 (or the right side 220), the front side 214, and the bottom side 226.

Turning now to FIGS. 4E and 4F, a partial cross-sectional view of the sand cube 210 in a loading position 410 and a dispensing position 420 respectively can be described. In FIG. 4E, the sand cube 210 can be located in an exemplary loading position 410 with the bottom side 226 mounted or sitting on a loading surface, e.g., transport 250. In this exemplary loading position 410, an inflow 414 of bulk material is illustrated flowing through inlet portal 230. A volume 416 of bulk material is accumulating within the interior 212 of the sand cube 210. In this view, the Turning to FIG. 4F, the sand cube 210 can be rotated an angle "M" into the dispensing position 420. In the exemplary dispensing position 420, an outflow 418 of material from the volume 416 of bulk material can exit the outlet portal 222 through a discharge gate 224. In some embodiments, the discharge gate 224 can meter the outflow 418 of material based on the position of the gate, e.g., 50% open. The angled dispenser 236 can be formed with the bottom side 226 and the front side 214 of the sand cube 210. In the exemplary sand cube 210, the bottom side 226 can form an angle "P1" with a horizontal axis and the front side 214 can form an angle "P2" with the horizontal axis. The angle "P1" and angle "P2" will depend on the degree of rotation, e.g., angle "M", of the sand cube. For example, the angle "P1" and "P2" will be 45 degrees when the angle "M" is 45 degrees. A projected angle between the bottom side 226 and the front side 214 can be 90 degrees, thus the summation of the angle "P1" and angle "P2" will be 90 degrees regardless of the angle "M". For example, if the sand cube 210 is rotated 30 degrees, e.g., angle "M" is 30 degrees, then angle "P1" is 30 degrees and angle "P2" is 60 degrees. As previously described, the outlet 222 and discharge gate 224 can be generally horizontal, e.g., parallel to the ground, in the dispensing position 420.

In some embodiments, the angled dispenser 236 can be described with angle "N" of FIG. 4D and angle "P1" and "P2" of FIG. 4F. For example, the angled dispenser 236 can comprise four walls with a 45 degree angle when angle "N" (FIG. 4D) is 45 degrees and angle "P1" and angle "P2" (FIG. 4F) are 45 degrees. In some embodiments, the angle of the walls of the angled dispenser 236 can be determined by the rotation, e.g., angle M, of the sand cube 210 in the dispensing position 420. For example, the angled dispenser 236 comprises a generally pyramidal shape with a front truncated side 214A, a left truncated side 238A, a bottom truncated side 226A, and a right truncated side 238B, wherein the left truncated side forms a first dispensing angle N1, wherein the right truncated side forms a second dispensing angle N2, and wherein the back side forms at least a 45 degree angle P1 and the front side forms at least a 45 degree angle P2 from a horizontal plane, e.g., the ground, when the storage cube is in a dispensing configuration. In some embodiments, the first dispensing angle N1 and the second dispensing angle N2 are the same. In some embodiments, the first dispensing angle N1 and the second dispensing angle N2 are the different.

In some embodiments, the outlet portal 222 comprises a generally quadrilateral shape with a front portal side 222A, a back portal side 222B, left portal side 222C, and a right portal side 222D. The front truncated side 214A comprises an inverted trapezoidal shape defined by a base extending the full width of the front side 214 and spaced a distance d1 from the top edge of front side 214, a left side extending from the left side of the base and intersecting a corner of the outlet portal formed by the left portal side 222C and the front portal side 222A, a right side extending from the right side of the base and intersecting a corner of the outlet portal formed by the right portal side 222D and the front portal side 222A, and a top formed by the front portal side 222A.

In some embodiments, the bottom truncated side 226A comprises an inverted trapezoidal shape defined by a base extending the full width of the bottom side 226 and spaced a distance d1 from the back edge of the bottom side 226, a left side extending from the left side of the base and intersecting a corner of the outlet portal formed by the left portal side 222C and the back portal side 222B, a right side extending from the right side of the base and intersecting a corner of the outlet portal formed by the right portal side 222D and the back portal side 222B, and a top formed by the back portal side 222B.

In some embodiments, the left truncated side 238A has an inverted trapezoidal shape defined by a base extending from (i) a first point (e.g., right edge of the base) located on the front edge of the left side 218 and spaced a distance d1 from the top edge of the left side 218 to (ii) a second point (e.g., left edge of the base) located on the bottom edge of the left side 218 and spaced a distance d2 from the back edge of the left side 218, a left side extending from the left edge of the base and intersecting a corner of the outlet portal formed by the left portal side 222C and the back portal side 222B, a right side extending from the right side of the base and intersecting a corner of the outlet portal formed by the left portal side 222C and the front portal side 222A, and a top formed by the left portal side 222C.

In some embodiments, the right truncated side 238B has an inverted trapezoidal shape defined by a base extending from (i) a first point (e.g., left edge of the base) located on the front edge of the right side 220 and spaced a distance d1 from the top edge of the right side 220 to (ii) a second point (e.g., right edge of the base) located on the bottom edge of the right side 220 and spaced a distance d2 from the back edge of the right side 220, a left side extending from the left edge of the base and intersecting a corner of the outlet portal formed by the right portal side 222D and the front portal side 222A, a right side extending from the right side of the base and intersecting a corner of the outlet portal formed by the right portal side 222D and the back portal side 222B, and a top formed by the right portal side 222D.

Figure 5A:
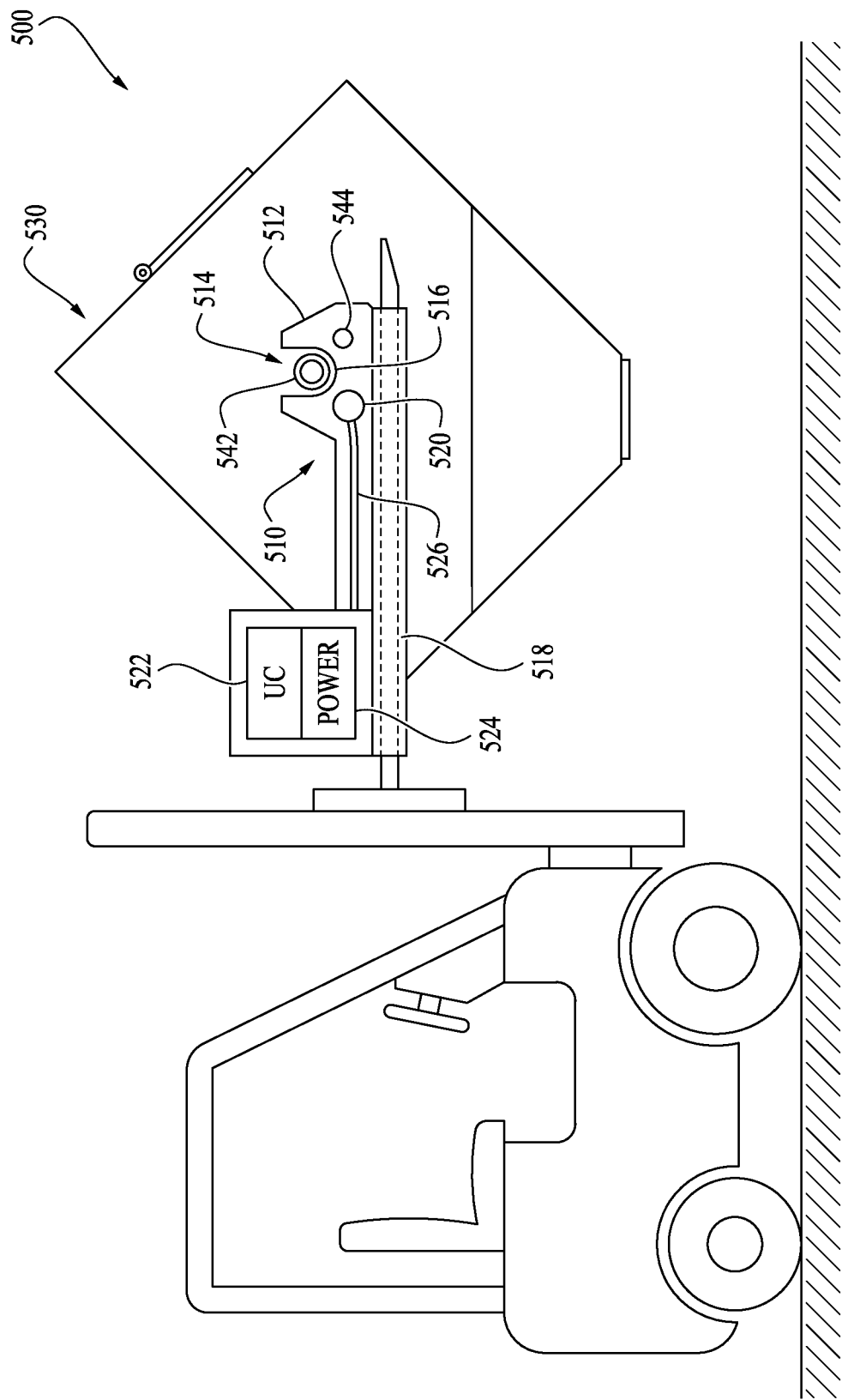
FIG. 5A is an illustration of a handling device coupled to the portable container according to another embodiment of the disclosure.

A handling device can be utilized to safely lift and manipulate the sand cube. Turning now to FIG. 5A, a sand cube manipulating environment 500 can be described. In some embodiments, a handling device 510 can be utilized to lift and manipulate, e.g., rotate, a storage cube 530. The storage cube 530 can be an embodiment of the sand cube 210. The handling device 510 comprises a support structure 512 with a receiving slot 514 and a lifting tube 518. The receiving slot 514 can include a bottom surface 516 configured to engage the trunnion, e.g., trunnion 242, of the storage cube 530. The support structure 512 can include one or more lifting tubes 518 that a forklift, a crane, or similar hoisting devices can engage to lift and manipulate the storage cube 530 about the remote wellsite. In some embodiments, the handling device 510 includes a unit controller 522 communicatively coupled to a power unit 524, a motor 520 and a plurality of sensors 544 via a cable 526.

Turning now to FIG. 5B, a partial cross-sectional view of the handling device 510 can be described. In some embodiments, the storage cube 530 can comprise a right positioning device and a left positioning device comprising a gear segment 538 rotationally coupled to the trunnion 542. The positioning device can engage the slot 514 and a positioning gear 532 of the handling device 510. For example, an outer surface 536 of a trunnion 542 of the positioning device can pass through the slot 514 to engage the bottom surface 516 of the handling device 510. A gear segment 538 (see FIG. 5C) can be mechanically coupled to the trunnion 542 and configured with gear teeth 540 to engage the positioning gear 532 of the handling device 510. The positioning gear 532 can be rotationally coupled to the motor 520 by an axle 534. The gear segment 538 can be configured to transfer torque and rotation from the handling device 510 via the gear 532 to the positioning device of the storage cube 530.

Turning now to FIGS. 5C and 5D, the handling device 510 can be configured to rotate the storage cube 530 from a first position, e.g., loading position 410, to a second position, e.g., dispensing position 420. In some embodiments, the handling device 510 can be configured to engage and hold or retain the storage cube 530 in a first position, e.g., loading position 410. For example, before the handling device 510 engages the storage cube 530, the motor 520 can fix or lock or retain the positioning gear 532 in a radial position to prevent rotation of the positioning gear 532. A service personnel can engage the storage cube 530 with the handling device 510 configured in the locked position or the loading position 410. The trunnion 542 of the storage cube 530 can pass through the slot 514 to contact the bottom surface 516 and the gear teeth 540 on the gear segment 538 can engage the positioning gear 532. The motor 520 can hold or lock the gear 532 a radial position to prevent the storage cube 530 from rotating when lifted off the loading surface, e.g., the transport.

In some embodiments, the one or more sensors 544 can provide feedback to the unit controller 522 of the system, e.g., the sand cube and lifting device. The one or more sensors 544 can include positional sensors, torque sensors, an accelerometer, and weight sensors. In some embodiments, the one or more sensors 544 can measure the weight of a component, a movement of a component, a torque of a component, a linear displacement of a component, an angular displacement of a component, a linear velocity of the a component, an angular velocity of a component, a linear acceleration of a component, or an angular acceleration of a component. For example, one or more sensors 544 can measure the angular position of the gear 532 and thus determine the angular position of the storage cube 530. In another scenario, one or more sensors 544 can measure the weight of the storage cube 530. In some embodiments, the sensors 544 can measure the flowrate of bulk materials dispensing from the outlet portal 222. In some embodiments, the sensors 544 can measure the movement of a portion of the bulk material within the interior 212 of the storage cube 530.

In some embodiments, the one or more sensors 544 can provide periodic datasets of measured data to the unit controller 522 at regular intervals, timed intervals, intermittent intervals, predetermined intervals, or on demand. For example, the one or more sensors 544 may communicate the information and/or a dataset at intervals of every hour, every minute, every second, every fraction of a second, every hundredth of a second, or upon request of the unit controller 522.

Returning to FIG. 5C, in some embodiments, the handling device 510 can determine the weight of the storage cube 530 via a periodic dataset from the one or more sensors 544 in response to lifting the storage cube 530 off of a loading platform, a portable support structure, or the surface of the earth. For example, the handling device 510 may determine the storage cube 530 is partially full, e.g., 90 percent full, and alert the service personnel of the estimated/determined capacity of the storage cube 530.

In some embodiments, the service personnel may transport the storage cube 530 from a first location to a second location in the first position, e.g., loading position 410. For example, the service personnel may lift the storage cube 530 from a transport or a storage location and move the storage cube 530 to a second location, e.g., a location with a hopper. In some embodiments, the service personnel may align the storage cube 530 with an unloading location, for example, a hopper, a conveyor, a portable container, or a portable support structure.

Returning to FIG. 5D, in some embodiments, the service personnel may direct the handling device 510 to rotate the storage cube 530 from a first position, e.g., a loading position 410, to a second position, a dispensing position 420. For example, the unit controller 522 can direct the positioning gear 532 to rotate a predetermined number of revolutions at a predetermined angular velocity to safely transition the storage cube 530 to the dispensing position 420. In some embodiments, the angle M is 45 degrees in the dispensing position 420. In some embodiments, the unit controller 522 may direct the gear 532 to transition the storage cube 530 in intervals or steps or fractions of angle "M". For example, the storage cube 530 may transition from a first position to the dispensing position 420 in five steps of 9 degrees each.

In some embodiments, the unit controller 522 may direct the discharge gate 224 on the outlet portal 222 to open. The unit controller 522 can open or partially open the discharge gate 224 to dispense the volume 416 of bulk material within the interior 212. In some embodiments, the unit controller 522 may open the discharge gate 224 as the storage cube 530 transitions in intervals or steps to the dispensing position 420. The unit controller 522 may partially open the discharge gate 224 to meter the outflow 418 of bulk material as the storage cube 530 transitions to the dispensing position 420. In some embodiments, the unit controller 522 may partially open the gate in intervals, e.g., 25% open or 50% open, based on the weight of bulk material and/or based on a measured flowrate of bulk material.

In some embodiments, the unit controller 522 may oscillate the storage cube 530 to dislodge bulk materials from the side walls of the storage cube 530. The oscillation of the storage cube 530 may be small back and forth rotations, e.g., positive and negative fractions of angle "M", of the trunnion 542 within the slot 514 of the handling device 510. For example, the unit controller 522 may direct the storage cube 530 to oscillate back and forth about the trunnion 542 via gear segment 538 rotationally coupled to the motor 520 and gear 532. The oscillations may include a positive 5 degrees and a negative 5 degrees from the dispensing position 420. Although the oscillations are described as a positive and negative 5 degrees, it is understood that the oscillations can be a positive and negative 1, 2, 3, 4, 5, 6, 7, 8, 9, 10, 11, 12, 13, 14, 15, 16, 17, 18, 19, or 20 degrees or any fraction of a degree between 0 to 20 degrees.

In some embodiments, the unit controller 522 may detect a volume of bulk material remaining within the storage cube 530 via sensors 544. In some embodiments, the unit controller 522 may alert the service personnel of the volume remaining within the storage cube 530 via input/output device. In some embodiments, the unit controller 522 may oscillate the storage cube 530 to dislodge bulk material from the side walls of the storage cube 530 in response to the volume of bulk material remaining, in response to direction from the service personnel, or both. In some embodiments, the unit controller 522 may close the discharge gate 224 before oscillating the storage cube 530.

Figure 6:
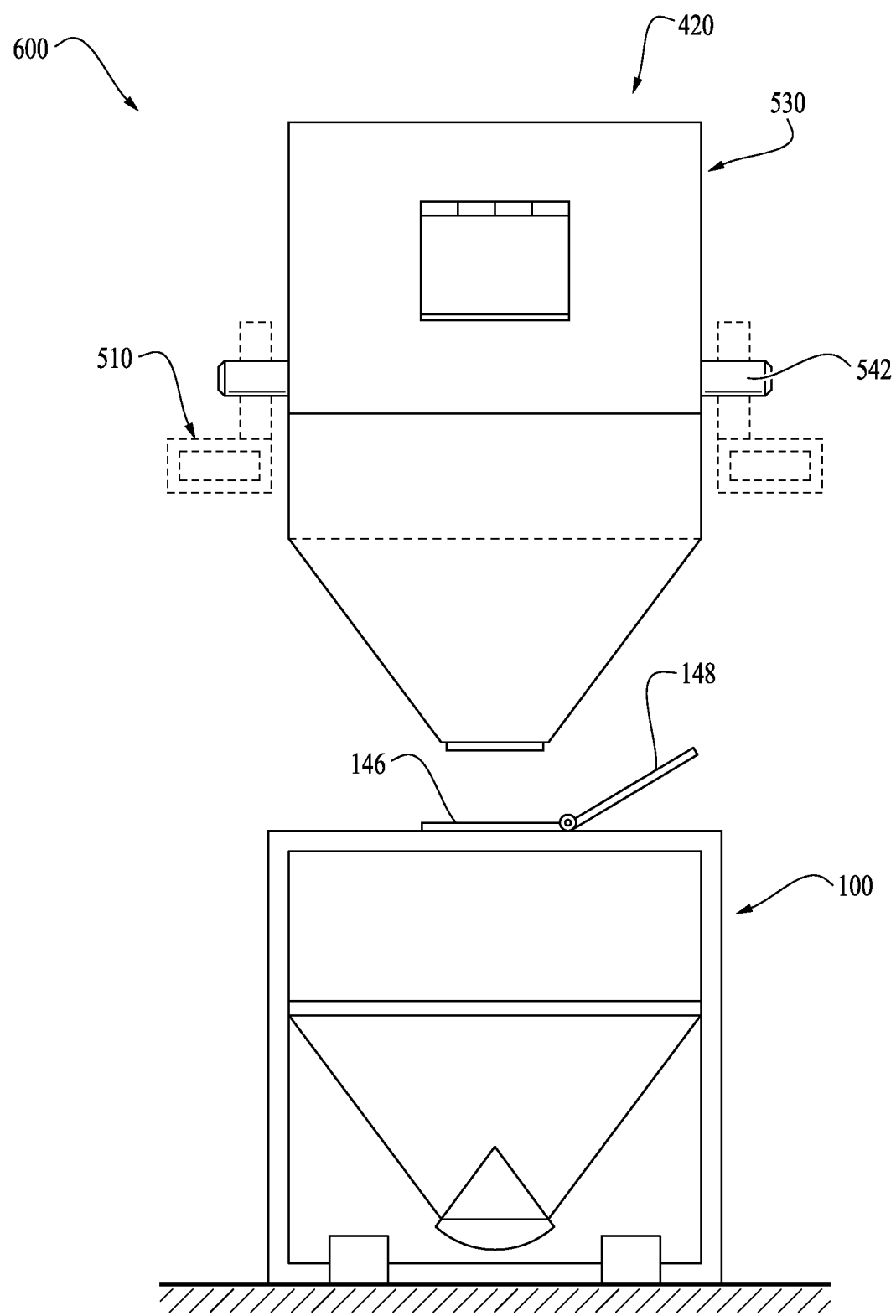
FIG. 6 is an illustration of loading at a remote wellsite according to an still another embodiment of the disclosure.

Turning now to FIG. 6, a portable container loading environment 600 can be described. In some embodiments, a portable container 100 can be loaded from a storage cube 530. A storage cube 530 can be elevated over a portable container 100 with a handling device 510 coupled to a hoisting device, e.g., a forklift. The storage cube 530 can be transitioned to a dispensing position 420 and the discharge gate 224 positioned to dispense the bulk material from the storage cube 530 into the portable container 100 via the inlet portal 146.

Figure 7:
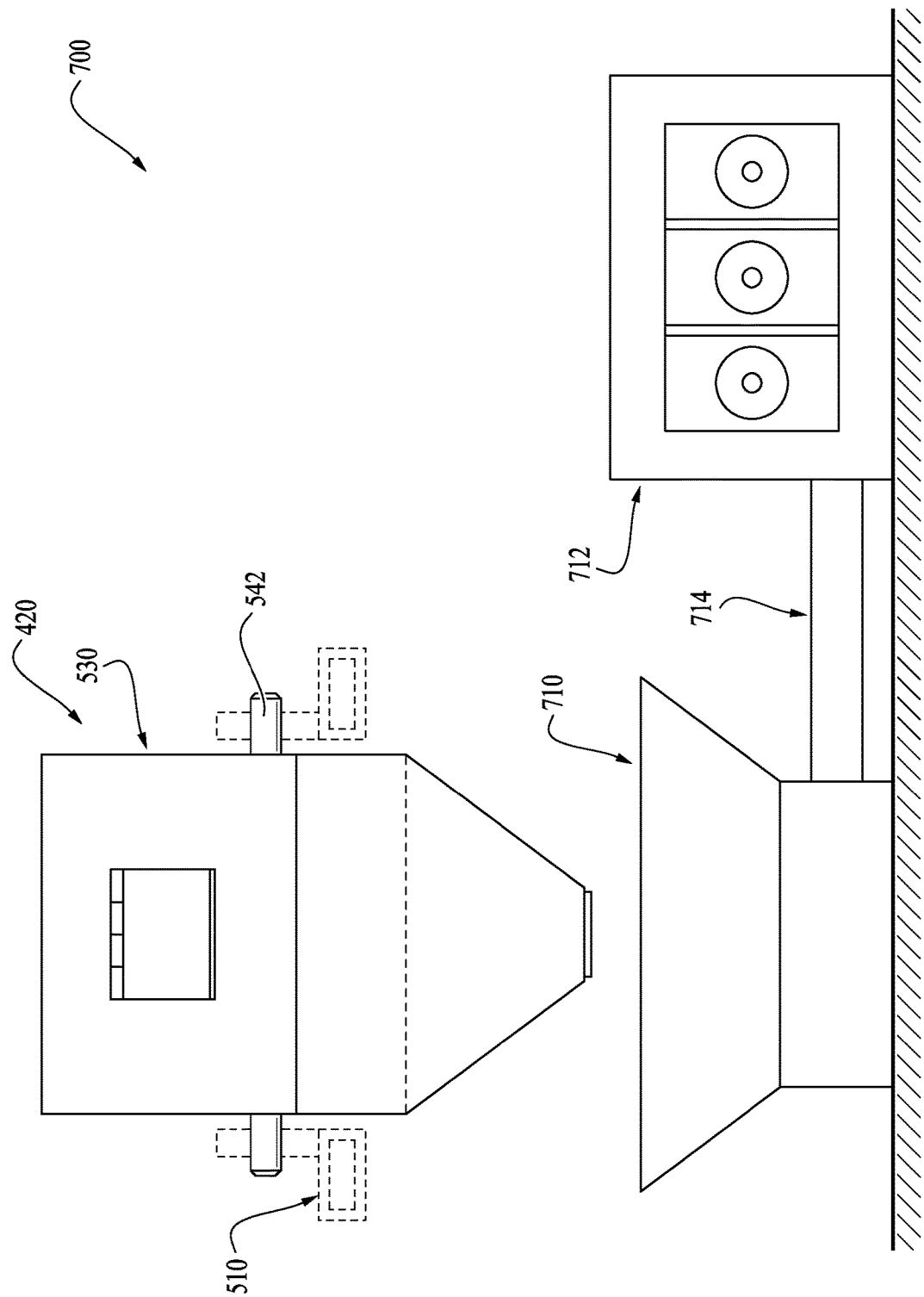
FIG. 7 is an illustration of the portable container dispensing into a hopper at a remote wellsite according to an yet another embodiment of the disclosure.

Turning now to FIG. 7, a hopper loading environment 700 can be described. In some embodiments, a hopper 710 can be loaded from a storage cube 530. A storage cube 530 can be elevated over a hopper 710 with a handling device 510 coupled to a hoisting device, e.g., a forklift. The storage cube 530 can be transitioned to a dispensing position 420 and the gate 224 positioned to dispense the bulk material from the storage cube 530 into the hopper 710. In some embodiments, the hopper can be fluidically coupled to a pump mechanism 712 by a transfer conduit 714, e.g., a sand screw. In some embodiments, the outflow 418 of material can be metered by the discharge gate 224.

Figure 8:
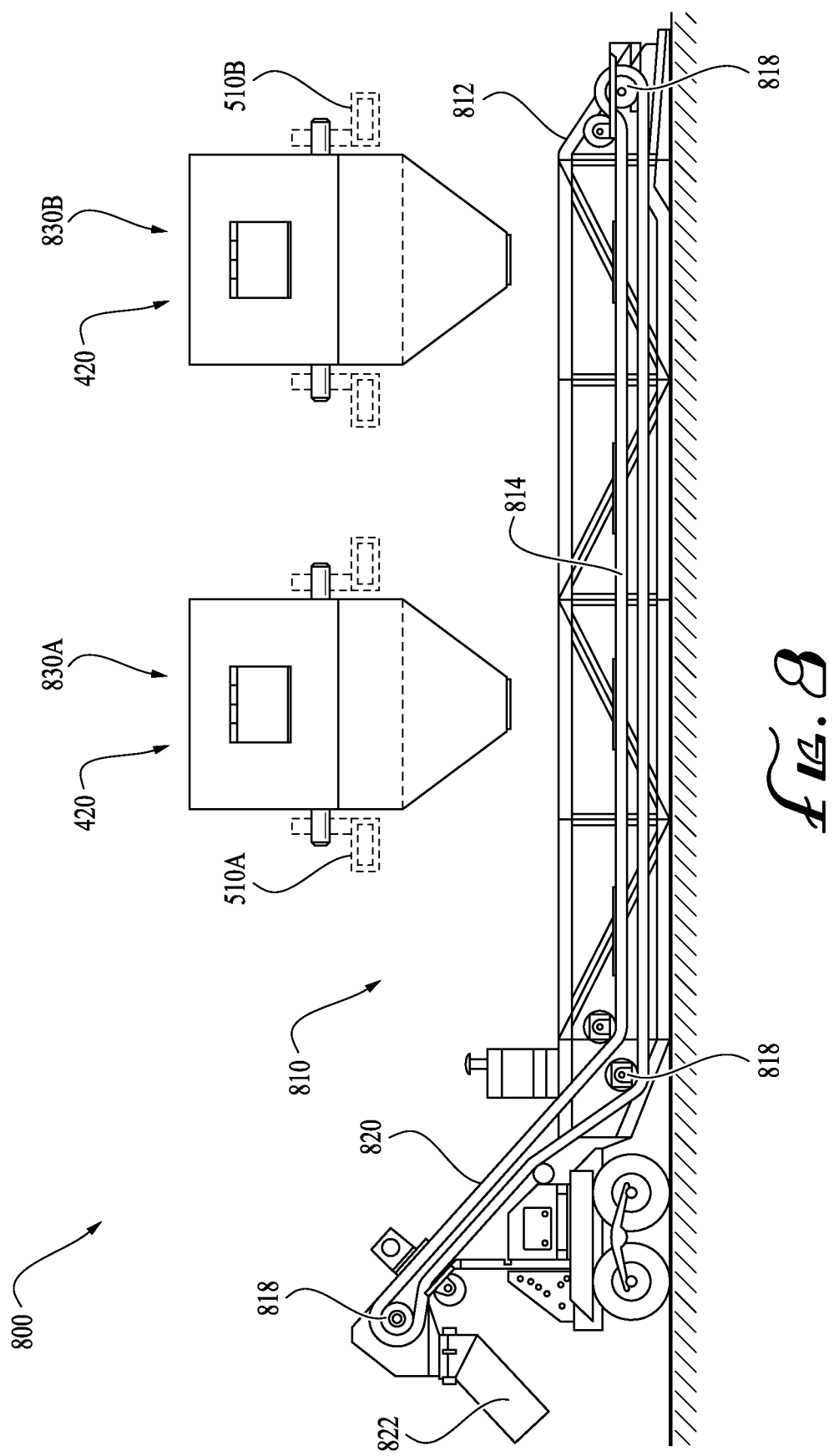
FIG. 8 is an illustration of multiple portable containers dispensing into a conveyor at a remote wellsite according to an yet another embodiment of the disclosure.

Turning now to FIG. 8, a conveyor loading environment 800 can be described. In some embodiments, a conveyor 810 can be loaded from a sand cube 830. The conveyor 810 can comprise a support frame 812, a transfer belt 814, a motorized roller 816, a plurality of guide rollers 818, an elevation neck 820, and dispensing chute 822. In some embodiments, the conveyor can transport bulk material across the wellsite to a hopper, a blender, or other inlet. In some embodiments, the conveyor 810 can be of sufficient length to accommodate two or more sand cubes 530. For example, a first sand cube 830A and a second sand cube 830B can be elevated over the conveyor 810 with a holding device 510A-B coupled to a first hoisting device and a second hoisting device, e.g., a forklift. Each storage cube 530A-B can be transitioned to a dispensing position 420 and the discharge gate 224 positioned to dispense the bulk material from the storage cube 530A-B onto the transfer belt 814 of the conveyor 810. In some embodiments, the conveyor 810 can be fluidically coupled to a hopper, e.g., hopper 710, by the chute 822. In some embodiments, the outflow 418A-B of material can be metered by the gate 224A-B.

Figure 9:
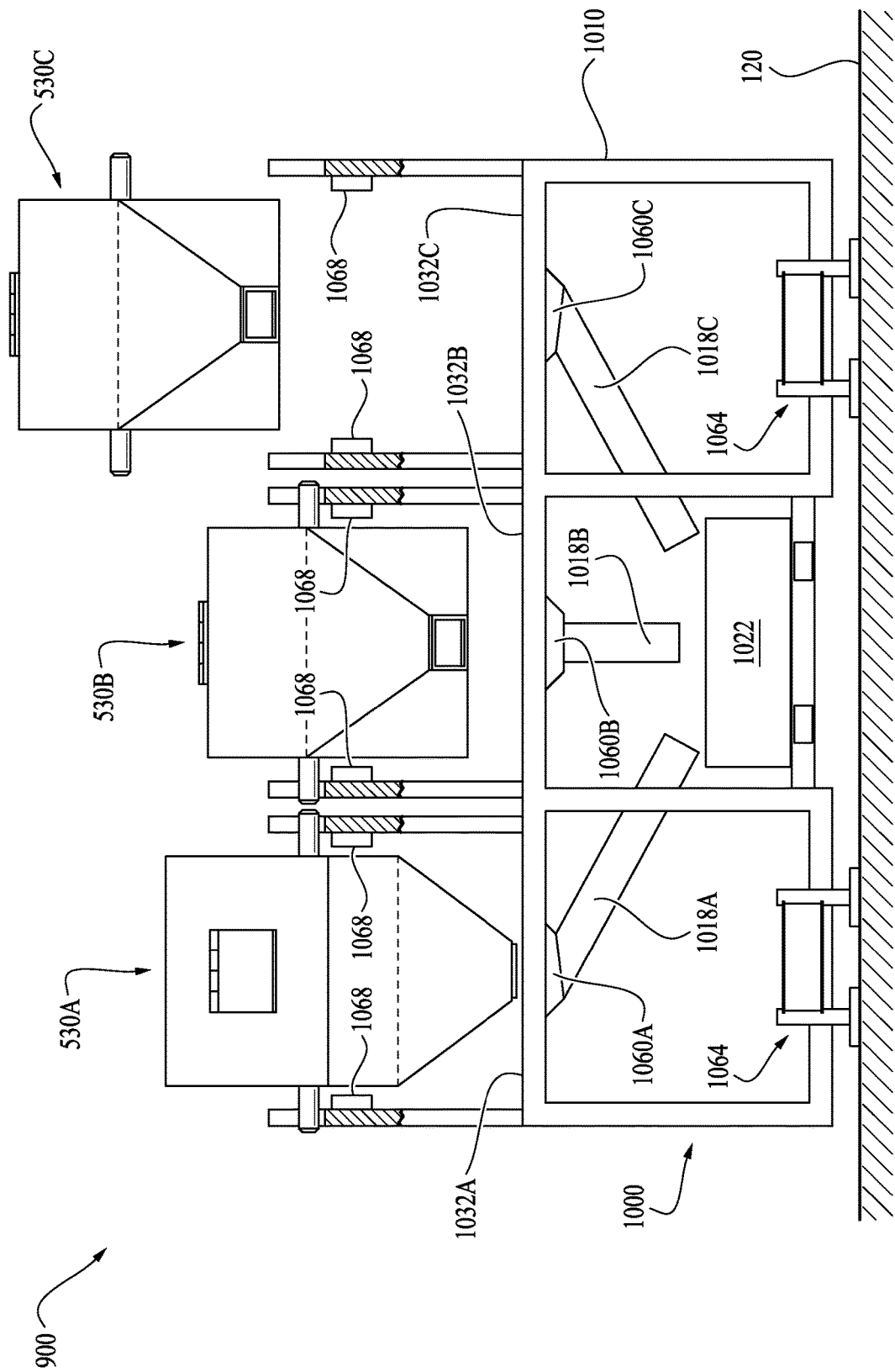
FIG. 9 is a side view of a bulk material handling system with portable containers according to still another embodiment of the disclosure.

The sand cube can be a part of a material handling system for transporting bulk materials to a remote wellsite and for feeding the bulk material into a hopper via a portable support structure. In some embodiments, the portable support structure can elevate one or more sand cubes to a sufficient height above the blender inlet and route the bulk material directly from the sand cube to the blender inlet. Turning now to FIG. 9, a bulk material handling system is described. The bulk material handling system 900 can include one or more sand cubes 530A-C mounted on one or more receiving bays 1132A-C and elevated by a portable support structure 1000. The portable support structure 1000 can include a set of outrigger devices 1064 to level and support the portable support structure 1000 with feet or pads that contact the ground surface 120. In an example, a first storage cube 530A can be loaded onto the portable support structure 1000 and rotated to a second position, e.g., dispensing position 420. The first storage cube 530A can release or dispense bulk material into a feed hopper 1060A, a gravity feed outlet 1018A, and into a blender hopper 1022. In another scenario, a second storage cube 530B can be loaded onto a receiving bay 1032B in a first position, e.g., a loading position 410. The second storage cube 530B can be transitioned from the first position to a second position to dispense or release bulk material into a feed hopper 1060B, a gravity feed outlet 1018B, and into a blender hopper 1022. In another scenario, a third storage cube 530C can be lifted or hoisted above the third receiving bay 1032C during the process to replace an empty sand cube (not shown). The third storage cube 530C can be configured to dispense or release bulk material into a feed hopper 160C, a gravity feed outlet 118C, and into a blender hopper 1022. In each of these scenarios, the supply of bulk material can be interrupted or prevented by the amalgamation of bulk material, e.g., clumping, in response to the moisture content of the bulk material adhering to the walls of the sand cube, e.g., storage cube 530A.

Figure 10:
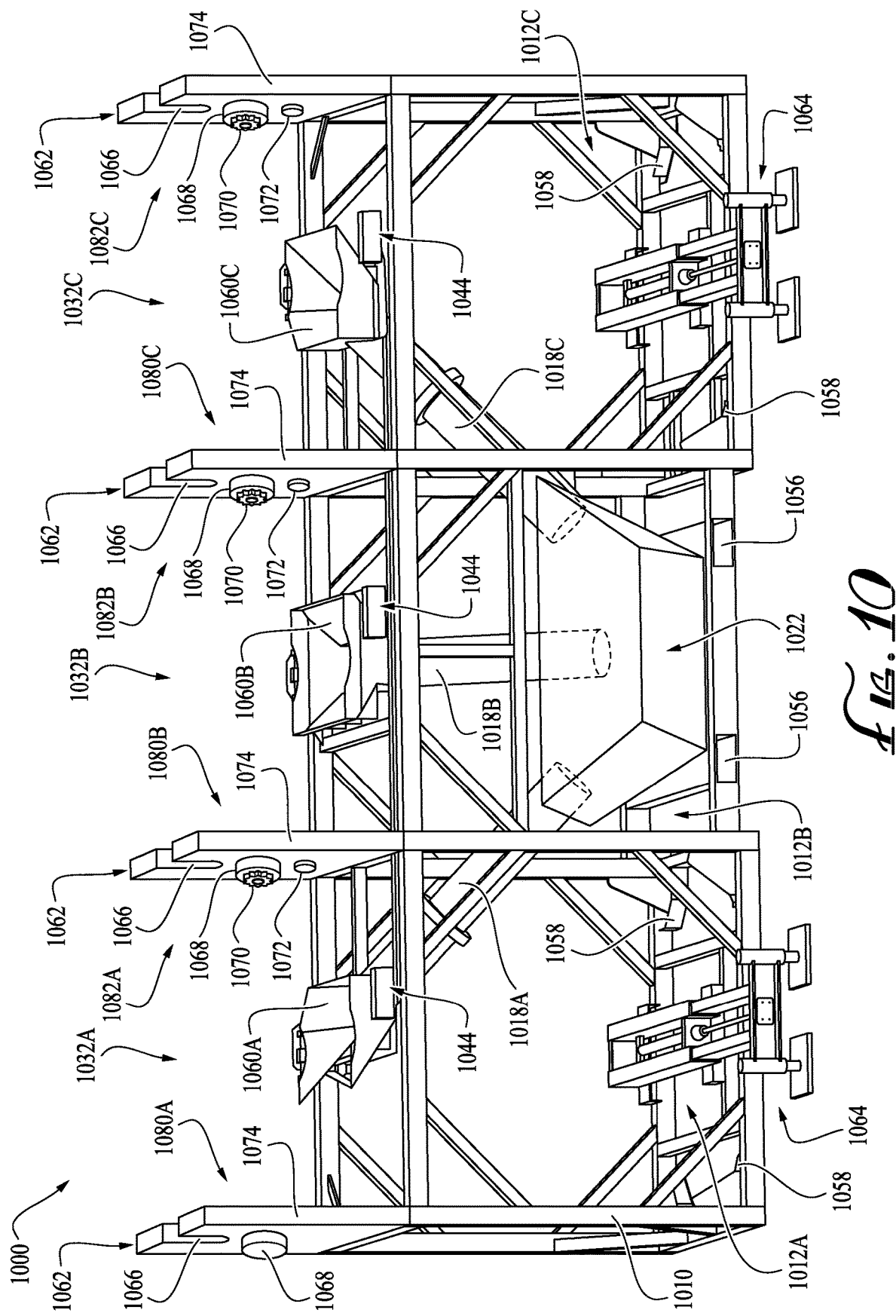
FIG. 10 is a side view of a portable support structure according to yet another embodiment of the disclosure.

Turning now to FIG. 10, a perspective view of a portable support structure 1000 can be described. In some embodiments, the portable support structure, also referred to as the support structure 1000, can be configured to receive one or more sand cubes 530. The support structure 1000 includes a frame 1010 sized to receive and support up to three sand cubes 530A-C. The frame 1010 can include several beams connected together (e.g., via welds, rivets or bolts) to form a continuous group of cubic/rectangular supports 1012 coupled end to end. For example, in the illustrated embodiment the frame 1010 generally includes one continuous, elongated rectangular body broken into three distinct cubic/rectangular supports 1012A, 1012B, and 1012C. Each cubic/rectangular support 1020 can form a receiving bay 1032 on top to receive, align, and support a single storage cube 530. For example, the three distinct cubic/rectangular supports 1012A, 1012B, and 1012C can have a corresponding receiving bay 1032A, 1032B, and 1032C formed along the top surface 1034 of the frame 1010. Each cubic/rectangular support 1012 can support and align a material routing path within the interior of the cubic/rectangular support 1012. The frame 1010 can include additional beams that function as trusses to help support the weight of the filled containers disposed on the frame 1010. Other shapes, layouts, and constructions of the frame 1010 may be used in other embodiments. In addition, other embodiments of the support structure 1000 may include a frame 1010 sized to receive other numbers (e.g., 1, 2, 4, 5, 6, 7, or more) sand cubes 530.

In some embodiments, the receiving bay 1032 on top of the cubic/rectangular supports 1012 may be equipped with a plurality of handling supports 1062 disposed on top of the frame 1010 for locating and holding the sand cubes 530 on the frame 1010. The handling supports 1062 comprise a support structure 1074, a locator feature, e.g., a slot 1066, a motor 1068, an positioning gear 1070, and one or more sensors 1072, e.g., a load sensors. The locator feature can guide or centralize the complementary engagement features, e.g., the trunnions 542, of the storage cube 530, thus enabling a precise placement of the sand cubes 530 into one of the receiving bays 1032 on the frame 1010. The one or more sensors 1072 within the handling supports 1062 can measure a characteristic of the storage cube 530, e.g., the weight or position, and can be communicatively coupled, wired or wirelessly, to a unit controller.

The plurality of handling supports 1062 can operate in tandem within each receiving bay 1032 to position a storage cube 530. Each of the receiving bays 1032 can have a left face 1080 and a right face 1082 that operate in tandem. The left face 1080 and right face 1082 comprise the slot 1066, the motor 1068, the positioning gear 1070, and the sensors 1072 aligned with the given receiving bay 1032. For example, the positioning gear 1070 of the right face 1080A and the positioning gear 1070 of the left face 1082A of the receiving bay 1032A can engage the storage cube 530A (as shown in FIG. operate in tandem to The support structure 1000 can include one or more actuators 1044 configured to actuate a discharge gate 224 of the one or more storage cube 530 disposed on the frame 1010. In some embodiments, the actuators 1044 may be rotary actuators configured to rotate into engagement with a discharge gate 224 of a storage cube 530 to transition the gate between a closed position and an open position. In other embodiments, the actuators 1044 may be linear actuators designed to interface with the discharge gates 224 of the sand cubes 530 to selectively open and close the gates. In some embodiments, the actuators 1044 may configure the gate in a meter position wherein the discharge gate 224 is partially open, e.g., 50% open, to partially constrain or meter the material dispensing through the discharge gate 224. In some embodiments, the support structure 1000 comprises a set of two actuators 1044 located on opposite sides of the frame 1010 for actuation of the gate on each storage cube 530.

The support structure 1000 may be transportable around the remote wellsite by a hoisting device, e.g., a forklift, a crane, or similar lifting devices. In some embodiments, the support structure 1000 can include slots 1056 that a forklift can engage to lift and manipulate the portable support structure 1000 about the remote wellsite. The slots 1056 may be formed through a central portion (e.g., central cubic/rectangular support 1012B) of the elongated support structure 1000 to keep the weight of the support structure evenly distributed during its movement at the site.

Once the forklift (or other hoisting device) brings the support structure 1000 to a desired location at the site, the hoisting device may lower the support structure 1000 onto the ground surface 120 or a relatively flat loading area proximate the ground level. The frame 1010 can include outrigger devices 1064 with feet or pads for increasing the size of the frame or the footprint of the frame 1010. The outrigger devices 1064 can include a leveling feature to level the frame 1010 on uneven ground surface 120. The outrigger devices 1064 can be configured to increase the stability of the support structure 1000 by keeping the support structure stable. The frame 1010 can include corner supports 1058 for distributing a weight of the support structure 1000 (and any sand cubes 530 disposed thereon) along the ground surface 120. In some embodiments, the corner supports 1058 may be disposed along the lower surface of the frame 1010 at various corners of the cubic/rectangular supports 1012.

As previously described, the support structure 1000 may include a material routing path corresponding to each receiving bay 1032. The material routing path comprises a gravity feed outlets 1018 for routing bulk material directly from one or more sand cubes 530 disposed on the frame 1010 into a blender hopper inlet 1022. The gravity feed outlets 1018A, 1018B, and 1018C may be used to deliver a flow of bulk material to the blender hopper 1022 (or other blender inlet) from each of three respective sand cubes 530 disposed on the frame 1010 as shown in FIG. 9. In some embodiments, the material routing path can also include individual hoppers 1060A, 1060B, and 1060C at the top of the frame 1010, e.g., within the receiving bay 1032, for funneling bulk material from the discharge gate of the corresponding sand cubes 530 into the gravity feed outlets 1018A, 1018B, and 1018C, respectively.

The term "blender inlet" used herein may refer to any number of inlets to tubs, hoppers, mixers, and other areas where bulk material is needed. As mentioned above, the blender hopper inlet 1022 may be associated with a blender disposed at a job site (e.g., at a wellsite). For example, the blender inlet may be a blender hopper (e.g., hopper 710 of FIG. 7) used to provide bulk material to a metering system that meters the bulk material into a mixer. Other embodiments may utilize other types of blender hopper 1022 for receiving the bulk material from the sand cubes 530 disposed on the support structure 1000.

In some embodiments, the service personnel may transport one or more sand cubes 530 from a first location, e.g., a material supply location, to a second location, e.g., a remote wellsite. For example, the one or more sand cubes 530 can be transported via a transport, e.g., a trailer or a truck. The service personnel may lift the storage cube 530 from the transport move the storage cube 530 to a second location with a handling device 510 and hoisting device, e.g., a forklift. The handling device 510 can retain the storage cube 530 in a first configuration or first position 410 during lifting and moving/transport. In some embodiments, the service personnel may align the storage cube 530 with an unloading location, for example, a hopper, a conveyor, a portable container, or a portable support structure.

In some embodiments, the storage cube 530 can be placed or located onto a portable support structure 1000 with the hoisting device and the handling device 510. The handling device 510 can retain the storage cube 530 in a first position 410 during the placement onto the support structure 1000. For example, the unit controller 522 can direct the positioning gear 532 to lock and/or prevent rotation or angular movement of the gear segment 538. The hoisting device can elevate the storage cube 530 above one of the receiving bays 1032 and align the trunnions 542 with the slots 1066 on the handling supports 1062. The storage cube 530 can be lowered into place so that the trunnions 542 contact the bottom surface of the slots 1066 and the gear segment 538 engages the positioning gear 1070. The handling device 510 can disengage from the storage cube 530 by lowering the handling device 510 so that the trunnions 542 disengage the slot 514 of the handling device 510.

In some embodiments, the unit controller on the support structure 1000 can register and/or recognize the storage cube 530 placed into the receiving bay 1032. For example, the unit controller of the support structure 1000 can log the storage cube 530 and details of the storage cube 530, e.g., contents, weight, volume, position, into memory. The unit controller can determine the position, e.g., a first position 410, of the sand cube.

In some embodiments, the unit controller can rotate the storage cube 530 from a first position to a second position, e.g., dispensing position 420. For example, the unit controller can be communicatively coupled to motor 1068 and one or more sensors 1072 and can direct the rotation of the positioning gear 1070 a predetermined number of revolutions at a predetermined angular velocity to safely transition the storage cube 530 to the dispensing position 420. In some embodiments, the angle M (as shown in FIG. 4B) is 45 degrees in the dispensing position 420. In some embodiments, the unit controller may direct the positioning gear 1070 to transition the storage cube 530 in intervals or steps or fractions of angle "M". For example, the storage cube 530 may transition from a first position to the dispensing position 420 in five steps of 9 degrees each.

In some embodiments, the unit controller of the support structure 1000 may direct the discharge gate 224 on the outlet portal 222 to open. The unit controller can open or partially open the discharge gate 224 to dispense the volume of bulk material within the interior, e.g., interior 212. In some embodiments, the unit controller may open the discharge gate 224 as the storage cube 530 transitions in intervals or steps to the dispensing position 420. The unit controller may partially open the discharge gate 224 to meter the outflow, e.g., outflow 418, of bulk material as the storage cube 530 transitions to the dispensing position 420. In some embodiments, the unit controller 522 may partially open the gate in intervals, e.g., 25% open or 50% open, based on the weight of bulk material and/or based on a measured flowrate of bulk material.

In some embodiments, the unit controller may receive periodic dataset indicative of a dispensing operation. For example, the unit controller may receive measurements of angular location, gate actuator position, weight of sand cube, rotational motion, angular motion, linear motion, and force measurements. In some embodiments, the unit controller may determine a volume or portion of a volume of bulk material within the storage cube 530. In some embodiments, the unit controller may detect the outflow, e.g., outflow 418, or absence of outflow of bulk material from the sand cube. In some embodiments, the unit controller can log or save the periodic datasets i) to memory, ii) to a storage location, iii) to a database, or combinations thereof.

In some embodiments, the unit controller may oscillate the storage cube 530 to dislodge bulk materials from the side walls of the storage cube 530. The oscillation of the storage cube 530 may be small back and forth rotations, e.g., positive and negative fractions of angle "M", about the trunnion 542 within the slot 1066 of the handling supports 1062. For example, the unit controller may direct the storage cube 530 to oscillate back and forth about the trunnion 542 via gear segment 538 rotationally coupled to the motor 1068 and gear 1070. The oscillations may include a positive 5 degrees and a negative 5 degrees from the dispensing position 420. Although the oscillations are described as a positive and negative 5 degrees, it is understood that the oscillations can be a positive and negative 1, 2, 3, 4, 5, 6, 7, 8, 9, 10, 11, 12, 13, 14, 15, 16, 17, 18, 19, or 20 degrees or any fraction of a degree between 0 to 20 degrees. In some embodiments, the unit controller can log or save the periodic datasets, the oscillations (e.g., angular velocity and angular position), the gate position, or combinations thereof to memory, to a storage location, to a database, or combinations thereof.

In some embodiments, the unit controller may oscillate two or more sand cubes 530 to dislodge bulk materials from at least one storage cube 530. The unit controller may close the discharge gates 224 on two or more sand cubes 530 and oscillate the sand cubes 530 in opposite directions to cancel out the swinging or angular momentum of the sand cube oscillations. For example, the unit controller may begin a first storage cube 530A oscillating in a positive direction (counter-clockwise) as a second storage cube 530B oscillates in a negative direction (clockwise).

In some embodiments, the unit controller of the support structure 1000 may detect a volume of bulk material remaining within the storage cube 530 via one or more sensors 1072. In some embodiments, the unit controller may alert the service personnel of the volume remaining within the storage cube 530 via an input/output device. In some embodiments, the unit controller may oscillate the storage cube 530 to dislodge bulk material from the side walls of the storage cube 530 in response to the volume of bulk material remaining, in response to direction from the service personnel, or both. In some embodiments, the unit controller may close the discharge gate 224 before oscillating the storage cube 530. In some embodiments, the unit controller can log or save the periodic datasets, the oscillations (e.g., angular velocity and angular position), the gate position, or combinations thereof to memory, to a storage location, to a database, or combinations thereof.

In some embodiments, the unit controller of the support structure 1000 may determine an amount or volume of bulk material remaining within the storage cube 530 via one or more sensors 1072. The unit controller may determine an angular oscillation value and/or an angular velocity value based on the amount or volume or weight of bulk material within the storage cube 530. In a scenario, the unit controller may determine the storage cube 530 can be oscillated by 15 degrees from the dispensing position with a slow angular velocity value, e.g., 10 degree/minute. In another scenario, the unit controller may determine the storage cube 530 can be oscillated by 3 degrees from the dispensing position with a fast angular velocity value, e.g., 60 degree/minute. In some embodiments, the unit controller can log or save the periodic datasets, the oscillations (e.g., angular velocity and angular position), the result of the oscillations (e.g., amount of additional bulk material dispensed), the gate position, or combinations thereof to memory, to a storage location, to a database, or combinations thereof.

In some embodiments, the unit controller of the support structure 1000 may utilize machine learning to determine a safe and effective oscillation to dislodge the bulk material from the sidewalls of the storage cube 530. A historical database may comprise identification of prior sand cubes, measurements of prior sand cubes, oscillations of prior sand cubes, results of oscillations of prior sand cubes, or combinations thereof. The historical database may comprise a training dataset for an oscillation model. A bulk material management process may be executing within the unit controller and may input an identification and a periodic dataset of one or more sand cubes 530 into the oscillation model. The oscillation model may output a safe and effective oscillation or series of oscillations for the one or more sand cubes 530. The unit controller can save or store the periodic datasets of the oscillations and results of the oscillations into memory and/or the historic database. In some embodiments, the oscillation model may determine an error value based on the periodic datasets of the oscillations and the results of the oscillations. In some embodiments, the oscillation model can utilize the error value and results of the oscillations to reduce the error value.

Figure 11:
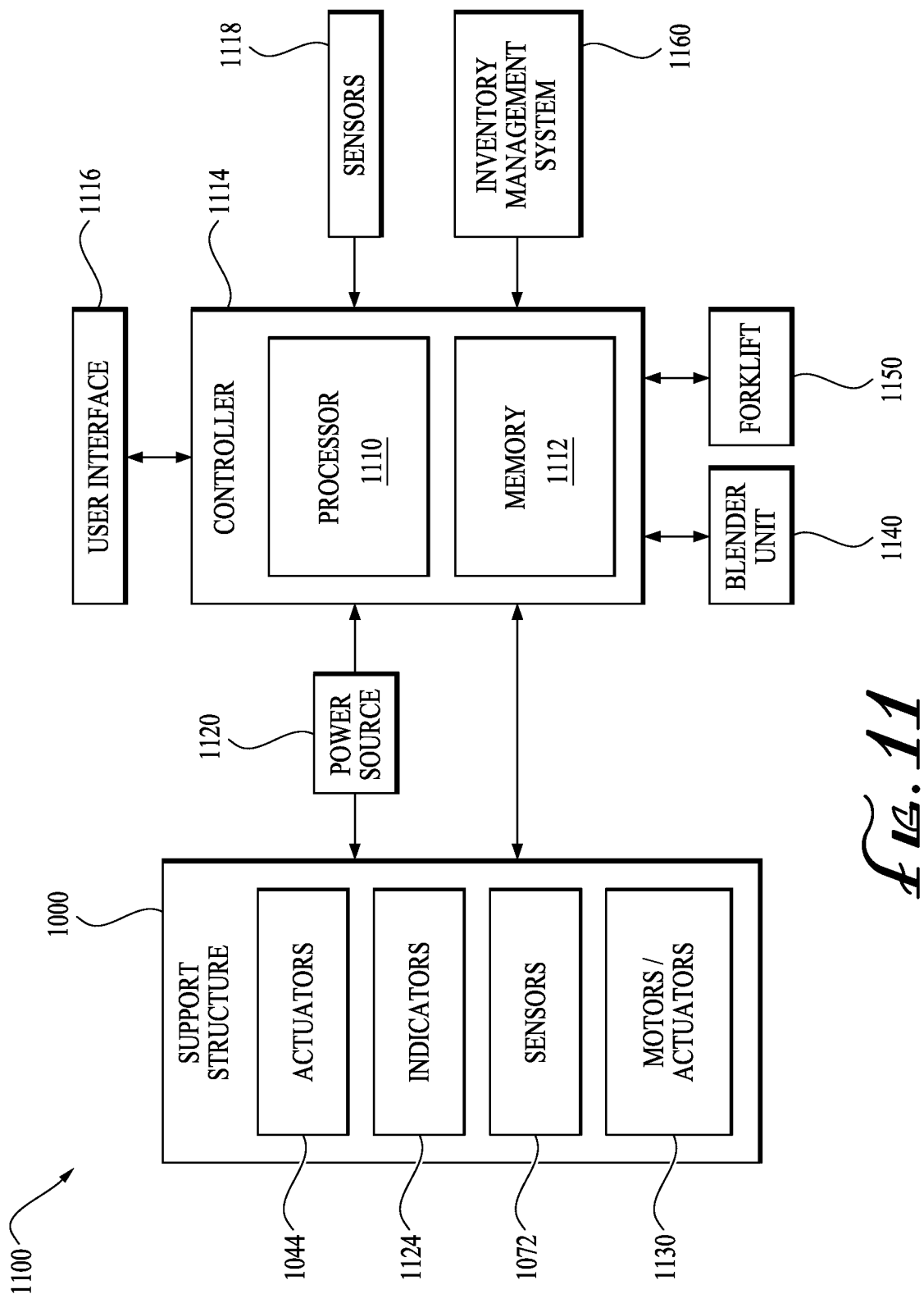
FIG. 11 is a block diagram of a computer system suitable for implementing one or more embodiments of the disclosure.

Turning now to FIG. 11, a block diagram of a computer system 1100 suitable for implementing one or more embodiments of the disclosure is described. In some embodiments, the handling device 510 and/or the portable support structure 1000 can comprise a unit controller 1114 to direct the handling and dispensing of bulk materials and to measure periodic datasets indicative of the wellbore servicing operation. The unit controller 1114 may be communicatively coupled to one or more other unit controllers and in some embodiments a system controller at the remote wellsite. The handling device 510 and/or support structure 1000 may include a number of electronic components, and these components may be communicatively coupled (e.g., via a wired connection or wirelessly) to one or more unit controllers 1114 (e.g., automated control system) at the wellsite. The unit controller 1114 may be communicatively coupled to several other wellsite components including, but not limited to, the blender unit 1140, a hoisting device (e.g., forklift) 1150, and various sensors 1126.

The unit controller 1114 can include one or more processors 1110 and a non-transitory memory component 1112 to monitor and/or control various operations and inventory at the wellsite. For example, one or more processors 1110 may be designed to execute instructions encoded into the one or more non-transitory memory components 1112. Upon executing these instructions, the processors 1110 may provide passive logging of the operational states of one or more components at the wellsite, as well as the amount, type, and location of bulk material/dry additive at the wellsite. In some embodiments, the one or more processors 1110 may execute instructions for controlling operations of certain wellsite components (e.g., support structure electronics). This may help to control sequencing of discharge gates on the sand cubes and/or bulk material containers, metering of dry additive into the blender unit 1140, and other operations related to material transfer at the wellsite.

In some embodiments, the unit controller 1114 may be coupled to a user interface 1116, which enables an operator to input instructions for execution by the unit controller 1114. The user interface 1116 may also output data relating to the operational state of the bulk material/dry additive handling system. In some embodiments, the user interface 1116 can display an indicia in response to the periodic datasets indicating a wet bulk material is not dispensing from a storage cube 530 and/or portable container 100. In some embodiment, the portable support structure 1000 can include a visual cue, e.g., a light, as an indicia of the portable container dispensing or not dispensing wet bulk material into a material routing path.

In some embodiments, the unit controller 1114 may be communicatively coupled to a number of sensors 1118, e.g., the sensors 544, disposed on the support structure 1000 and/or handling device 510 and/or about the wellsite. Based on feedback from these sensors 1118, the unit controller 1114 may determine when to actuate discharge gates, e.g., discharge gate 224, to switch between different material containers, e.g., portable container 100, and dry additive containers that are positioned on the support structure 1000 and/or handling device 510. The unit controller 1114 may also be communicatively coupled to a number of controllable components disposed on the support structure 1000, the blender unit 1140, and/or the forklift 1150. The unit controller 1114 may actuate certain of these controllable components based on sensor feedback from sensors 1118 and/or sensors 544.

The support structure 1000 may include a number of electronic components such as, for example, an automated actuators 1044 described above with reference to FIG. 10. These actuators 1044 may be controlled to open and/or close a discharge gate, e.g., discharge gate 224, of one or more sand cubes 530 and/or portable containers, e.g., portable container 100, elevated on the support structure 1000. The support structure 1000 may also include one or more indicators 1124 (e.g., indicator lights) disposed on the support structure for providing various information about the operating state of the support structure 1000.

In some embodiments, the support structure 1000 may include various sensors 1072 (e.g., fill level sensors, cameras, load cells, etc.) designed to take measurements and provide sensor feedback to the unit controller 1114. The sensors 1072 may be used to detect levels of bulk material and dry additive present in the hopper and/or output chutes, information regarding the number of containers disposed on the support structure 1000, as well as the fill level of bulk material or dry additive within the individual containers on the support structure 1000. The unit controller 1114 may actuate the discharge gates, e.g., discharge gate 224, on different containers, e.g., storage cube 530, with precisely controlled timing based on the received sensor feedback, e.g., sensor 1072 and/or sensor 544.

In some embodiments, the positioning gears 1070 via the motors 1068 of the support 1062 of the portable support structure 1000 and/or handling device 510 can be communicatively coupled to the unit controller 1114. The unit controller 1114 can oscillate a storage cube 530 by actuating the positioning gear 1070 via the motor 1068. In some embodiments, the unit controller 1114 can oscillate the sand cubes 530 based on a predetermined sequence for each storage cube 530. In some embodiments, the unit controller 1114 can actuate the positioning gear 1070 rotationally coupled to the storage cube 530 based on periodic datasets from various sensors 1126, e.g., sensors 544.

The unit controller 1114, the support structure electronics, or both, may utilize power from an external power source 1120 and/or power unit 524, as shown. In other embodiments, the support structure 1000 and/or handling device 510 may include its own power source 1120 and/or power unit 524 for operating the onboard electronics and sensors.

In some embodiments, the unit controller 1114 may be communicatively coupled to an inventory management system 1160 that monitors the inventory of bulk material and dry additive on location. The inventory management system 1160 may include a separate control/monitoring system or may be incorporated into the unit controller 1114. The inventory management system 1160 may track bulk material inventory and dry additive inventory on location through the use of RFID technology or other identification tracking techniques. Each portable container, e.g., storage cube 530, may feature an identification component (e.g., RFID tag) used to provide an indication of the particle size, bulk volume, weight, type, material, and/or supplier of the bulk material or dry additive present in the container. In some embodiments, the identification components may be rewritable such that the bulk material or dry additive inventory of individual containers can be updated after discharging a portion of its contents at the support structure 1000, the hopper 710, or the conveyor 810. The inventory management system 1160 may be communicatively coupled to an RFID reader disposed in proximity to the containers being moved about the wellsite.

In some embodiments, the unit controller 1114 may provide control signals to the handling support 1062, via the motor 1068, and actuators 1044 used to open and/or close the discharge gates 224 of the sand cubes 530 with appropriate timing for maintaining a steady supply of bulk material and dry additive to the blender unit 1140. In some embodiments, an operator may use the user interface 1116 to manually sequence the oscillatory devices 310 and initiate gate actuations of any desirable bulk material or dry additive containers on the support structure 1000. Additional manual override techniques may also be available using, for example, manual hydraulic, pneumatic, or mechanical controls.

Additional Disclosure

The following are non-limiting, specific embodiments in accordance with the present disclosure:

A first embodiment, which is a storage cube configured to transport bulk material to a wellsite, comprising a generally cube shape of sidewalls defining an interior, wherein the sidewalls comprise a bottom side, a top side, a front side, a back side, a right side, and a left side; a left trunnion coupled to the left side; a right trunnion coupled to the right side; an inlet gate coupled to an inlet portal located on the top side, wherein the inlet gate is configurable to an open position or a closed position; an angled dispenser having a generally pyramidal shape comprising a front truncated side, a left truncated side, a bottom truncated side, and a right truncated side, wherein the left truncated side forms a first dispensing angle, wherein the right truncated side forms a second dispensing angle, and wherein the back side and the front side form at least a 45 degree angle from a horizontal plane when the storage cube is in a dispensing configuration; a discharge gate coupled to an outlet portal located on i) the bottom side, ii) the front side, or iii) a combination of the bottom side and front side and wherein the dispensing gate is configurable to i) an open position, ii) a meter position, or iii) a closed position; and wherein the first dispensing angle and the second dispensing angle is at least 45 degrees.

A second embodiment, which is the bulk material handling system of the first embodiment, wherein each trunnion is generally rod shaped or cylinder shaped.

A third embodiment, which is the storage cube of the first or second embodiment, further comprising a position guide coupled to the left trunnion, the right trunnion, or both.

A fourth embodiment, which is the storage cube of any of the first through the third embodiments, wherein the position guide is generally a plate shape with a plurality of gear teeth positioned along a perimeter of a circle shape, a half circle shape, a quarter circle shape, or a portion of a circle within a range of 20 degrees to 120 degrees.

A fifth embodiment, which is the storage cube of any of the first through the fourth embodiments, wherein the left trunnion and right trunnion are located proximate to an axis passing through a center of gravity of the storage cube with the interior filled with bulk material.

A sixth embodiment, which is the storage cube of any of the first through the fifth embodiments, wherein the left truncated side is a beveled corner comprising a portion of the front side, the left side, and the bottom side, wherein the right truncated side is a beveled corner comprising a portion of the front side, the right side, and the bottom side, wherein the front truncated side comprises a remaining portion of the front side that is not beveled, and wherein the bottom truncated side is a remaining portion of the bottom side that is not beveled.

A seventh embodiment, which is the storage cube of any of the first through the sixth embodiments, wherein the storage cube is configured to deliver a volume of bulk material greater than a comparable volume of a portable container.

An eighth embodiment, which is system of handling bulk materials at a wellsite, comprising: a storage cube comprising a generally cube shape of sidewalls with an angled dispenser and a left a left trunnion coupled to a left side, a right trunnion coupled to a right side, and a position guide coupled to the left trunnion, the right trunnion, or both; a handling device coupled to hoisting device, wherein the handling device comprises a support frame, a left rotary actuator and a right rotary actuator, wherein each of the rotary actuators comprises a receiving slot, and a positioning gear rotationally coupled to a motor, and wherein the positioning gear rotationally couples to the position guide of the storage cube with the positioning gear; wherein the handling device is configured to: i) configure the storage cube with a volume of bulk material in a transport position; ii) transport the storage cube to a dispensing location on the wellsite; iii) align a discharge gate of the storage cube with a target inlet at the dispensing location; and iv) configure the storage cube in a dispensing position; and wherein the sidewalls of the angled dispenser form at least a 45 degree angle with ground in the dispensing position.

A ninth embodiment, which is the system of the eighth embodiments, wherein the sidewalls comprise a bottom side, a top side, a front side, a back side, the right side, and the left side.

A tenth embodiment, which is the system of any of the eighth through the ninth embodiments, wherein the left trunnion and right trunnion of the storage cube slidingly couples with a corresponding receiving slot of the handling device.

An eleventh embodiment, which is the system of any of the eighth through the tenth embodiments, wherein the handling device is coupled to a forklift or a crane.

An twelfth embodiment, which is the system of any of the eighth through the eleventh embodiments, wherein the target inlet comprises i) a portable container, ii) a hopper, iii) a conveyor or iv) a portable stand at the dispensing location.

A thirteenth embodiment, which is the system of any of the eighth through the twelfth embodiments, wherein the handling device is further configured to: v) open a discharge gate coupled to an outlet portal of the storage cube to an open position or a partially open position; vi) oscillate the storage cube; vii) determine a volume of bulk material remaining within the storage cube; and viii) determine an empty condition of the storage cube in response to the volume of bulk material remaining being below a threshold volume.

A fourteenth embodiment, which is the system of the eighth through the thirteenth, wherein a bottom of the storage cube is generally horizontal in the transport position; and wherein outlet portal of the storage cube is generally horizontal in the dispensing position.

A fifteenth embodiment, which is method of delivering bulk materials to a wellsite, comprising transporting a storage cube with a volume of bulk material to a remote wellsite via a transport, wherein a storage cube comprising a generally cube shape of sidewalls with an angled dispenser and a left a left trunnion coupled to a left side, a right trunnion coupled to a right side, and a position guide coupled to the left trunnion, the right trunnion, or both; transporting the storage cube via a handling device to a dispensing location on the remote wellsite, wherein the handling device comprises a support frame, a left rotary actuator and a right rotary actuator, and wherein the handling device is configured to retain the storage cube in a first position; dispensing bulk material from the storage cube into a target inlet of i) portable container, ii) a hopper, iii) a conveyor or iv) a portable stand at the dispensing location; wherein dispensing bulk material comprises the steps of: i) aligning a discharge gate of the storage cube with a target inlet; ii) configuring the storage cube in a dispensing position; iii) opening the discharge gate of the storage cube; iv) determining a volume of bulk material within the storage cube; v) oscillating the storage cube; and determining an empty condition of the storage cube.

A sixteenth embodiment, which is the method of the fifteenth embodiments, further comprising loading a storage cube onto a transport; filling the storage cube to a filled condition with a volume of bulk material from a bulk material supply; wherein the volume of bulk material is transferred into an inlet portal of the storage cube at the bulk material supply; and wherein the filled condition of the storage cube comprises the volume of bulk material plus an empty weight of the storage cube.

A seventeenth embodiment, which is the method of any of the fifteenth through the sixteenth embodiments, further comprising lifting the storage cube with a handling device coupled to hoisting device.

A eighteenth embodiment, which is the method of any of the fifteenth through the seventeenth embodiments, wherein a filled weight of a filled condition of the storage cube is below a threshold transportation weight limit; and wherein the transport is i) a truck, ii) a trailer, iii) a railcar, iv) a barge, or v) a ship.

A nineteenth embodiment, which is the method of any of the fifteenth through the eighteenth embodiments, wherein the handling device comprises a receiving slot, and a positioning gear rotationally coupled to a motor; wherein the rotary actuator of the handling device mechanically couples to the positioning guide of the storage cube with the trunnions of the storage cube slidingly coupled to the receiving slot and a gear segment of the storage cube rotationally coupling to the positioning gear; and wherein the handling device is coupled to a forklift or a crane.

A twentieth embodiment, which is the method of any of the fifteenth through the nineteenth embodiments, further comprising returning the storage cube in the empty condition to a bulk material supply.

A twenty-first embodiment, which is a storage cube configured to transport bulk material to a wellsite, comprising a generally cube shape of sidewalls defining an interior, wherein the sidewalls comprise a bottom side 226, a top side 228, a front side 214, a back side 216, a right side 220, and a left side 218 and wherein at least a portion of the sidewalls intersect at about 90 degree angles to form the generally cube shape; a left trunnion coupled to the left side; a right trunnion coupled to the right side; an inlet gate coupled to an inlet portal located on the top side, wherein the inlet gate is configurable to an open position or a closed position; an angled dispenser having a generally pyramidal shape comprising a front truncated side 214A, a left truncated side 238A, a bottom truncated side 226A, and a right truncated side 238B, wherein the left truncated side forms a first dispensing angle N1, wherein the right truncated side forms a second dispensing angle N2, and wherein the back side forms at least a 45 degree angle P1 and the front side forms at least a 45 degree angle P2 from a horizontal plane 430 when the storage cube is in a dispensing configuration; a discharge gate 224 coupled to an outlet portal 222 located on i) the bottom side, ii) the front side, or iii) a combination of the bottom side and front side and wherein the discharge gate is configurable to i) an open position, ii) a meter position, or iii) a closed position; and wherein the first dispensing angle and the second dispensing angle is at least 45 degrees, wherein the outlet portal 222 has a generally quadrilateral shape with a front portal side 222A, a back portal side 222B, left portal side 222C, and a right portal side 222D; wherein the front truncated side 214A has an inverted trapezoidal shape defined by a base extending the full width of the front side 214 and spaced a distance d1 from the top edge of front side 214, a left side extending from the left side of the base and intersecting a corner of the outlet portal formed by the left portal side 222C and the front portal side 222A, a right side extending from the right side of the base and intersecting a corner of the outlet portal formed by the right portal side 222D and the front portal side 222A, and a top formed by the front portal side 222A; wherein the bottom truncated side 226A has an inverted trapezoidal shape defined by a base extending the full width of the bottom side 226 and spaced a distance d1 from the back edge of the bottom side 226, a left side extending from the left side of the base and intersecting a corner of the outlet portal formed by the left portal side 222C and the back portal side 222B, a right side extending from the right side of the base and intersecting a corner of the outlet portal formed by the right portal side 222D and the back portal side 222B, and a top formed by the back portal side 222B; wherein the left truncated side 238A has an inverted trapezoidal shape defined by a base extending from (i) a first point (e.g., right edge of the base) located on the front edge of the left side 218 and spaced a distance d1 from the top edge of the left side 218 to (ii) a second point (e.g., left edge of the base) located on the bottom edge of the left side 218 and spaced a distance d2 from the back edge of the left side 218, a left side extending from the left edge of the base and intersecting a corner of the outlet portal formed by the left portal side 222C and the back portal side 222B, a right side extending from the right side of the base and intersecting a corner of the outlet portal formed by the left portal side 222C and the front portal side 222A, and a top formed by the left portal side 222C; and wherein the right truncated side 238B has an inverted trapezoidal shape defined by a base extending from (i) a first point (e.g., left edge of the base) located on the front edge of the right side 220 and spaced a distance d1 from the top edge of the right side 220 to (ii) a second point (e.g., right edge of the base) located on the bottom edge of the right side 220 and spaced a distance d2 from the back edge of the right side 220, a left side extending from the left edge of the base and intersecting a corner of the outlet portal formed by the right portal side 222D and the front portal side 222A, a right side extending from the right side of the base and intersecting a corner of the outlet portal formed by the right portal side 222D and the back portal side 222B, and a top formed by the right portal side 222D.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A system for handling bulk materials at a wellsite, comprising:
   a storage cube comprising a generally cube shape of sidewalls with an angled dispenser and a left trunnion coupled to a left side, a right trunnion coupled to a right side, and a position guide coupled to the left trunnion, the right trunnion, or both; and
   a handling device coupled to a hoisting device, wherein the handling device comprises a support frame and one or more actuators, wherein one or more actuators each comprise a receiving slot, and a positioning gear rotationally coupled to a motor, and wherein the positioning gear rotationally couples to the position guide of the storage cube with the positioning gear,
   wherein the handling device is configured to:
      i) configure the storage cube with a volume of bulk material in a transport position;
      ii) transport the storage cube to a dispensing location on the wellsite;
      iii) align a discharge gate of the storage cube with a target inlet at the dispensing location;
      iv) configure the storage cube in a dispensing position;
      v) open a discharge gate coupled to an outlet portal of the storage cube to an open position or a partially open position;
      vi) oscillate the storage cube;
      vii) determine a volume of bulk material remaining within the storage cube; and
      viii) determine an empty condition of the storage cube in response to the volume of bulk material remaining being below a threshold volume, and
   wherein the sidewalls of the angled dispenser form at least a 45 degree angle with ground in the dispensing position.

2. The system of claim 1, wherein the storage cube further comprises:
   an inlet gate coupled to an inlet portal, wherein the inlet gate is configurable to an open position or a closed position;
   wherein the sidewalls comprise a bottom side, a top side, a front side, a back side, the right side, and the left side,
   wherein the angled dispenser has a generally pyramidal shape comprising a front truncated side, a left truncated side, a bottom truncated side, and a right truncated side, wherein the left truncated side forms a first dispensing angle, wherein the right truncated side forms a second dispensing angle; and
   a discharge gate coupled to the outlet portal, which is located on i) the bottom side, ii) the front side, or iii) a combination of the bottom side and front side, wherein the discharge gate is configurable to i) an open position, ii) a meter position, or iii) a closed position.

3. The system of claim 2, wherein each trunnion is generally rod shaped.

4. The system of claim 2, wherein each trunnion is generally cylinder shaped.

5. The system of claim 4, wherein the position guide is generally a plate shape with a plurality of gear teeth positioned along a perimeter of a circle shape, a half circle shape, a quarter circle shape, or a portion of a circle within a range of 20 degrees to 120 degrees.

6. The system of claim 2, wherein the left trunnion and the right trunnion are located proximate to an axis passing through a center of gravity of the storage cube with the interior filled with bulk material.

7. The system of claim 2, wherein the left truncated side is a beveled corner comprising a portion of the front side, the left side, and the bottom side, wherein the right truncated side is a beveled corner comprising a portion of the front side, the right side, and the bottom side, wherein the front truncated side comprises a remaining portion of the front side that is not beveled, and wherein the bottom truncated side is a remaining portion of the bottom side that is not beveled.

8. The system of claim 1, wherein the storage cube is configured to deliver a volume of bulk material greater than a comparable volume of a portable container.

9. The system of claim 1, wherein the sidewalls comprise a bottom side, a top side, a front side, a back side, the right side, and the left side.

10. The system of claim 1, wherein the left trunnion and the right trunnion of the storage cube slidingly couple with a corresponding receiving slot of the handling device.

11. The system of claim 1, wherein the handling device is coupled to a forklift or a crane.

12. The system of claim 1, wherein the target inlet comprises i) a portable container, ii) a hopper, iii) a conveyor or iv) a portable stand at the dispensing location.

13. The system of claim 1, wherein the outlet portal of the storage cube is generally horizontal in the dispensing position.

14. The system of claim 1, wherein a bottom of the storage cube is generally horizontal in the transport position.

15. The system of claim 1, wherein the one or more actuators comprise a left rotary actuator and a right rotary actuator.

16. A method of delivering bulk materials to a wellsite, comprising:
   transporting a storage cube with a volume of bulk material to a remote wellsite via a transport, wherein the storage cube comprises a generally cube shape of sidewalls with an angled dispenser and a left trunnion coupled to a left side, a right trunnion coupled to a right side, and a position guide coupled to the left trunnion, the right trunnion, or both;
   transporting the storage cube via a handling device to a dispensing location on the remote wellsite, wherein the handling device comprises a support frame, a left rotary actuator and a right rotary actuator, and wherein the handling device is configured to retain the storage cube in a first position; and
   dispensing bulk material from the storage cube into a target inlet of i) a portable container, ii) a hopper, iii) a conveyor or iv) a portable stand at the dispensing location,
   wherein dispensing bulk material comprises the steps of:
      i) aligning a discharge gate of the storage cube with a target inlet;
      ii) configuring the storage cube in a dispensing position;
      iii) opening the discharge gate of the storage cube;
      iv) determining a volume of bulk material within the storage cube;
      v) oscillating the storage cube; and
      vi) determining an empty condition of the storage cube.

17. The method of claim 16, further comprising:
   loading a storage cube onto the transport; and
   filling the storage cube to a filled condition with the volume of bulk material from a bulk material supply,
   wherein the volume of bulk material is transferred into an inlet portal of the storage cube at the bulk material supply, and
   wherein the filled condition of the storage cube comprises the volume of bulk material plus an empty weight of the storage cube.

18. The method of claim 16, further comprising lifting the storage cube with the handling device, which is coupled to a hoisting device.

19. The method of claim 16, wherein a filled weight of a filled condition of the storage cube is below a threshold transportation weight limit, and wherein the transport is i) a truck, ii) a trailer, iii) a railcar, iv) a barge, or v) a ship.

20. The method of claim 16, wherein
   the handling device comprises a receiving slot, and a positioning gear rotationally coupled to a motor,
   the handling device mechanically couples to the positioning guide of the storage cube, and
   the handling device is coupled to a forklift or a crane.

21. The method of claim 16, further comprising:
   returning the storage cube in the empty condition to a bulk material supply.

* * * * *